United States Patent
Ishida et al.

(10) Patent No.: US 7,020,339 B2
(45) Date of Patent: Mar. 28, 2006

(54) IMAGE DECODING APPARATUS AND IMAGE DECODING METHOD FOR DECODING IMAGE DATA INCLUDING PLURAL IMAGE SEQUENCES, AND PROGRAM STORAGE MEDIUM

(75) Inventors: Takanori Ishida, Osaka (JP); Takahiro Nishi, Osaka (JP); Shintarou Nakatani, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 917 days.

(21) Appl. No.: 09/960,324

(22) Filed: Sep. 24, 2001

(65) Prior Publication Data

US 2002/0041714 A1 Apr. 11, 2002

(30) Foreign Application Priority Data

Sep. 22, 2000 (JP) .............................. 2000-287845

(51) Int. Cl.
*G06F 13/00* (2006.01)

(52) U.S. Cl. ..................................................... 382/232
(58) Field of Classification Search ................ 382/232, 382/234; 709/238, 246
See application file for complete search history.

(56) References Cited

U.S. PATENT DOCUMENTS 5,774,206 A 6/1998 Wasserman et al.
5,850,258 A 12/1998 Kang

FOREIGN PATENT DOCUMENTS

| EP | 0954181 A2 | 11/1999 |
|---|---|---|
| EP | 1021043 A2 | 7/2000 |
| EP | 1120977 A1 | 8/2001 |
| JP | 09093577 | 4/1997 |

OTHER PUBLICATIONS

Patent Abstracts of Japan, vol. 1997, No. 8, Aug. 29, 1997 & JP 09 093577 A (Toshiba Corp), Apr. 1997.

*Primary Examiner*—Robert B. Harrell
(74) *Attorney, Agent, or Firm*—Wenderoth, Lind & Ponack, L.L.P.

(57) ABSTRACT

An image decoding apparatus includes a decoder having a decoding data storage register for holding decoding data corresponding to a target VOP to be decoded, and decoding a video stream corresponding to the target VOP on the basis of the decoding data stored in the register. The image decoding apparatus also includes a first memory having plural storage regions for holding decoding data corresponding to plural objects. The decoding data are transferred between the decoding data storage register in the decoder and a specific storage region in the first memory. Therefore, it is possible to perform decoding on a video stream including plural objects by using a single decoder. Further, even when the number of objects to be decoded is increased, storage regions for decoding data corresponding to the increased objects can easily be increased.

9 Claims, 14 Drawing Sheets

Fig.14(a) Prior Art

| ID | | |
|---|---|---|
| 0 | VOP000 VOP001 | ~ Sb0 |
| 1 | VOP000 VOP001 | ~ Sb1 |
| 2 | VOP000 VOP001 | ~ Sb2 |
| 3 | VOP000 VOP001 | ~ Sb3 |

Fig.14(b)

ID: 0 1 2 3 0 1 2 3
VOP000 VOP000 VOP000 VOP000 VOP001 VOP001 VOP001 VOP001 ...... ~ Vs

IMAGE DECODING APPARATUS AND IMAGE DECODING METHOD FOR DECODING IMAGE DATA INCLUDING PLURAL IMAGE SEQUENCES, AND PROGRAM STORAGE MEDIUM

FIELD OF THE INVENTION

The present invention relates to an image decoding apparatus, an image decoding method, and a program storage medium. More particularly, the present invention relates to an image decoding process in which image data corresponding to plural image sequences can be decoded with a single decoder.

BACKGROUND OF THE INVENTION

FIG. 11(a) is a diagram for explaining a conventional image decoding apparatus 50.

This image decoding apparatus 50 decodes coded image data corresponding to a single image sequence. The image decoding apparatus 50 includes a decoder 51 and a memory 52. The decoder 51 receives, for example, a video stream based on a standard such as MPEG2 (Moving Picture Experts Group Phase 2) as image data Sb, decodes the image data for each frame, and outputs decoded image data Db. The memory 52 stores the decoded image data of the already decoded frames, as reference image data Dr to be referred to in the decoding process.

In the image decoding apparatus 50, decoding of the inputted coded image data Sb is carried out with reference to the reference image data Dr which is stored in the memory 52, and the decoded image data Db obtained in the decoding process is outputted. The decoded image data Db corresponding to the target frame is stored in the memory 52 as the reference image data Dr for the frames subsequent to the target frame.

In the conventional image decoding apparatus 50 constructed as described above, however, image data which can be decoded simultaneously are limited to those corresponding to a single image sequence. Therefore, the conventional apparatus 50 cannot perform parallel decoding of image data corresponding to plural image sequences, for example, image data corresponding to plural objects (image sequences) which exist in one frame as shown in FIG. 13 (in FIG. 13, four objects Ob0–Ob3).

Thus, there has been proposed a construction of an image decoding apparatus 110 shown in FIG. 11(b), which can perform parallel decoding of image data corresponding to plural image sequences (objects) as shown in FIG. 13.

The image decoding apparatus 110 shown in FIG. 11(b) receives a video stream which includes coded image data Sb0–Sb3 shown in FIG. 14(a) corresponding to the four image sequences Ob0–Ob3 shown in FIG. 13, respectively, for example, a video stream Vs in which the coded image data Sb0–Sb3 are multiplexed as shown in FIG. 14(b), and decodes the coded image data Sb of the respective image sequences in parallel with each other. Although the respective coded image data are multiplexed in regular arrangements in the video stream Vs shown in FIG. 14(b), there are cases, depending on the multiplexing method, where the respective coded image data are randomly arranged according to the frame rates or the like of the respective coded data.

That is, the image decoding apparatus 110 includes: decoders 112a–112d for decoding the respective coded image data Sb0–Sb3 corresponding to the four image sequences, and outputting decoded image data Db0–Db3 corresponding to the respective image sequences; and memories 113a–113b for holding reference image data Dr0–Dr3 which are to be referred to when the respective image sequences are decoded.

Further, the image decoding apparatus 110 includes: an input-side switch 111 for supplying the inputted video stream Vs to one of the four decoders 112a–112d on the basis of image sequence identifying information Id for identifying an image sequence; and an output-side switch 114 for selecting one of the decoded image data Db0–Db3 outputted from the four decoders 112a–112d, and outputting the selected decoded image data Db as reproduced image data EDb.

The input-side switch 111 has an input terminal 111a to which the video stream Vs is applied, and output terminals 111b0–111b3 for outputting the coded image data Sb0–Sb3 to the corresponding decoders 112a–112d. The input-side switch 111 connects the input terminal 111a to one of the output terminals 111b0–111b3 which corresponds to the image sequence indicated by the image sequence identifying information Id. The output-side switch 114 has input terminals 114a0–114a3 to which the decoded image data Db0–Db3 outputted from the respective decoders 112a–112d are applied, and an output terminal 114b for outputting the reproduced image data EDb. The output-side switch 114 connects the output terminal 114b to one of the input terminals 114a0–114a3 which corresponds to the image sequence indicated by the image sequence identifying information Id.

Next, the operation of the conventional image decoding apparatus 110 constructed as described above will be described.

When the video decoding apparatus 110 receives the video stream Vs including the image data Sb0–Sb3 of the four image sequences, and the image sequence identifying information Id for identifying image data in the video stream Vs, the input-side switch 111 connects the input terminal 111a to which the video stream Vs is applied, to a desired output terminal of the input side switch 111 on the basis of the image sequence identifying information Id. For example, when the coded image data Sb0 corresponding to the first image sequence is inputted as the video stream Vs, the image sequence identifying information Id indicates that the video stream Vs is the coded image data Sb0 corresponding to the first image sequence Ob0. Thereby, in the input-side switch 111, the input terminal 111a is connected to the first output terminal 111b0 on the basis of the image sequence identifying information Id, and the coded image data Sb0 is supplied to the first decoder 112a corresponding to the first output terminal 111b0.

In the first decoder 112a, decoding of the coded image data Sb0 is carried out with reference to the reference image data Dr0 that is stored in the first memory 113a, and the decoded image data Db0 obtained in the decoding process is outputted to the first input terminal 114a0 of the output-side switch 114.

Then, in the output-side switch 114, the output terminal 114b is connected to the first input terminal 114a0 on the basis of the image sequence identifying information Id, and the decoded image data Db0 from the first decoder 112a is outputted as the reproduced image data EDb.

When the coded image data Sb1, Sb2, or Sb3 corresponding to the second, third, or fourth image sequence is inputted as the video stream Vs, in the same manner as described above, the input-side switch 111 changes the connecting state between the input terminal and the output terminal thereof according to the image sequence identifying information Id so that the inputted coded image data Sb is supplied to the corresponding decoder 112, and the output-side switch 114 changes the connecting state between the input terminal and the output terminal thereof so that the decoded image data Db from the decoder 112 corresponding to the image sequence indicated by the image sequence identifying information Id is outputted as the reproduced image data EDb. As the result, decoding of the coded image data Sb corresponding to the image sequence indicated by the image sequence identifying information Id is carried out.

In the image decoding apparatus 110 which can decode the plural coded image data Sb in parallel with each other, as shown in FIG. 11(b), the independent decoders 112a–112b are required for the respective image data to be processed in parallel, and a decoder 112 to be used should be selected according to an image sequence which corresponds to the inputted video stream Vs. However, this leads to drawbacks such as a complicated construction of the image decoding apparatus, an increased size of the image decoding apparatus and, further, increased costs due to the complicated and large-sized construction.

Further, in the method of performing parallel decoding on plural image data by using a number decoders as many as the number of the image sequences to be decoded, the number of decoders corresponding to the image sequences to be decoded must be decided in advance.

Furthermore, Japanese Published Patent Application No. Hei.9-093577 discloses an image decoding apparatus which is constructed to perform time division decoding on image data corresponding to plural image sequences by using a single decoder. Hereinafter, the image decoding apparatus disclosed in this literature will be briefly described.

FIG. 12 is a block diagram for explaining this image decoding apparatus.

The image decoding apparatus 200 comprises a decoder 200a and a memory 200b. The decoder 200a performs time division decoding on image data corresponding to plural (four in this case) image sequences, on the basis of a video stream Vs including the image data corresponding to the four image sequences, and image sequence identifying information Id for identifying each image sequence. The memory 200b stores reference image data Dr to be referred to when the decoding is carried out.

The decoder 200a includes dedicated registers 211–214, parameter selectors 221–224, a register selector 230, and a decoding unit 240. The dedicated registers 211–214 correspond to the respective image sequences, and each register stores decoding data which comprises data (parameter data) Dp indicating plural parameters 0–N that are used for decoding. The parameter selectors 221–224 correspond to the respective dedicated registers 211–214, and each parameter selector selects a storage position for each parameter in the corresponding register, on the basis of parameter storage position information Ip indicating the types of the parameters. The register selector 230 selects one of the parameter selectors 221–224 on the basis of the image sequence identifying information Id, thereby selecting one of the dedicated registers 211–214. The decoding unit 240 decodes the video stream Vs, on the basis of the decoding information including the parameter data Dp stored in each register, with reference to the reference image data Dr stored in the memory 200b, and outputs decoded image data Db obtained by the decoding process.

The decoding unit 240 extracts the parameter data Dp (decoding information) corresponding to each frame in each image sequence on the basis of header information included in the video stream Vs, and outputs the parameter data Dp to the register selector 230 and, simultaneously, outputs parameter storage position information Ip indicating the type of the parameter to the respective parameter selectors 221–224.

In the dedicated registers 211–214, the respective parameter data Dp indicating the parameters 0–N are stored in the parameter storage positions R0–Rn corresponding to the respective parameters. Further, the register selector 230 has a first terminal 235 for accessing each dedicated register which stores the decoding information of each image sequence, and plural second terminals 231–234 corresponding to the respective dedicated registers 221–224, for accessing the parameter data Dp stored in the respective registers 211–214. The register selector 230 connects the first terminal 235 to any of the second terminals 231–234 according to the image sequence identifying information Id.

Further, the parameter selector 221 has a first terminal b connected to the second terminal 231 of the register selector 230, and second terminals a0–an for accessing the parameter data Dp stored in the respective parameter storage positions R0–Rn of the register 211. The parameter selector 222 has a first terminal b connected to the second terminal 232 of the register selector 230, and second terminals a0–an for accessing the parameter data Dp stored in the respective parameter storage positions R0–Rn of the register 212. Likewise, the parameter selector 223 has a first terminal b connected to the second terminal 233 of the register selector 230, and second terminals a0–an for accessing the parameter data Dp stored in the respective parameter storage positions R0–Rn of the register 213. The parameter selector 224 has a first terminal b connected to the second terminal 234 of the register selector 230, and second terminals a0–an for accessing the parameter data Dp stored in the respective parameter storage positions R0–Rn of the register 214.

Next, a description will be given of the operation of the image decoding apparatus 200 constructed as described above.

When the video stream Vs and the image sequence identifying information Id are inputted to the image decoding apparatus 200, the video stream Vs is analyzed by the decoding unit 240, whereby the parameter data Dp, as decoding information corresponding to a predetermined image sequence, is extracted from the video stream Vs and outputted to the register selector 230. Further, the parameter storage position information Ip indicating the type of each parameter data Dp which is extracted as decoding information from the video stream Vs is sequentially outputted to the respective parameter selectors 221–224.

In the register selector 230, on the basis of the image sequence identifying information Id, the parameter data Dp from the decoding unit 240 is outputted to a desired parameter selector, for example, the parameter selector 221. In the parameter selector 221, on the basis of the parameter storage position information Ip outputted from the decoding unit 240, the respective parameter data Dp as decoding information from the register selector 230 are sequentially stored in the corresponding parameter storage positions in the exclusive register 211. To be specific, the parameter data Dp corresponding to the parameters 0, 1, . . . , N are stored in the parameter storage positions R0, R1, . . . , Rn in the register 211, respectively.

In the decoding unit 240, on the basis of the parameter data Dp as decoding information stored in the register 211, decoding is performed on the video stream Vs corresponding to a target frame of a predetermined image sequence, with reference to the reference image data Dr stored in the memory 200b. When this decoding is completed, image data corresponding to the already processed frame is stored in the memory 200b as reference image data Dr to be referred to when decoding the following frames.

Further, when the video stream Vs corresponding to another image sequence is inputted, the parameter data Dp as decoding information is stored in the register corresponding to the image sequence and, thereafter, decoding is performed on the video stream Vs corresponding to this image sequence, on the basis of the parameter data Dp stored in the register.

As described above, in the image decoding apparatus 200 shown in FIG. 12, the decoder 200a is provided with the dedicated registers (decoding information storage registers) for storing decoding information, which number as many as the number of image sequences that are to be decoded. Therefore, it is possible to decode the video stream Vs including plural image sequences by using one decoder. However, although the image decoding apparatus 200 can perform parallel decoding of the plural image sequences included in the video stream Vs by using one decoder 200a, the decoder 200a should be provided with the decoding information storage registers which number as many as the number of image sequences that are to be processed.

As described above, in the conventional image decoding apparatus, in order to perform parallel decoding on image data of plural image sequences, it is necessary to prepare decoders which number as many as the number of the image sequences to be processed simultaneously, or it is necessary to provide a decoder having decoding information storage registers which number as many as the number of the image sequences to be processed simultaneously. In other words, in the conventional image decoding apparatus, the number of image sequences to be processed simultaneously must be known in advance.

Accordingly, when the number of image sequences to be processed simultaneously is changed, the construction of the decoder must be reviewed or the decoder must be redesigned according to the change. This causes an increase in the cost of the image decoding apparatus.

Furthermore, when the image decoding apparatus is provided with decoders which number as many as the number of image sequences that are to be processed simultaneously, the construction of the apparatus is complicated, and the size of the apparatus is increased.

Moreover, among MPEG schemes as international standards relating to image data compression techniques, in MPEG4 by which coded image data of plural image sequences are handled simultaneously, coded image data corresponding to plural objects (image sequences) as shown in FIG. 14 are decoded and composited to obtain reproduced data corresponding to a composite image shown in FIG. 13, and the composite image is displayed. Accordingly, in the coding scheme based on MPEG4, image data corresponding to plural objects (image sequences) constituting one scene are multiplexed by packets to be transmitted as a single bit stream. In order to handle such bit stream, parallel decoding of the image data corresponding to the plural image sequences is required.

Accordingly, in the future, as an image decoding apparatus for simultaneously performing parallel decoding processes on image data of plural image sequences, a simple and inexpensive apparatus which can easily cope with a change in the number of image sequences to be handled simultaneously will be increasingly demanded.

SUMMARY OF THE INVENTION

The present invention is made to solve the above-described problems. Accordingly, an object of the present invention is to provide an image decoding apparatus and an image decoding method, which can perform decoding on image data of plural image sequences by using a single decoder, and which can code with an increase in the number of image sequences to be handled simultaneously by a simple change in construction.

It is another object of the present invention to provide a program storage medium which contains a program for implementing the image decoding method by software.

Other objects and advantages of the invention will become more apparent from the following detailed description. The detailed description and specific embodiments described herein are provided only for illustration since various additions and modifications within the scope of the present invention will be apparent to those skilled in the art from the detailed description.

According to a first aspect of the present invention, an image decoding apparatus for decoding image data including plural image sequences. The imaging decoding apparatus of the first aspect comprises: a memory having plural memory regions corresponding to the respective image sequences, and being operable to hold decoding data to be used when the image data of the respective image sequences are decoded; a memory region selection unit operable to select one of the memory regions in the memory, which memory region corresponds to a target image sequence to be decoded, on the basis of image identifying information which indicates the target image sequence; a decoder having a register operable to hold the decoding data of the target image sequence, and perform decoding on the image data of the target image sequence on the basis of the decoding data stored in the register; and a decoding data transfer unit operable to transfer the decoding data of the target image sequence between the memory region selected by the memory region selection unit and the register in the decoder. Therefore, the decoder can always refer to the decoding data of the target image sequence to be decoded, whereby decoding processes for the plural image sequences can be performed by a single decoder. Further, even when the target image sequence is changed, since the decoder always refers to the decoding data stored in the decoding data storage region in the register, the computational complexity relating to a computation for specifying the decoding data storage region can be reduced. Moreover, since the memory regions for holding the decoding data of the respective image sequences are secured on the memory, even when the number of image sequences to be decoded is increased, it is possible to cope with such increase in the number of image sequences by allocating, on the memory, memory regions for holding decoding data of these image sequences, without altering the construction of the decoder.

According to a second aspect of the present invention, an image decoding apparatus is provided for decoding image data including plural image sequences. The image decoding apparatus of the second aspect comprises: a memory having plural individual memory regions corresponding to the respective image sequences, where the memory is operable to hold decoding data to be used when the image data of the respective image sequences are decoded, and where the memory has a temporary memory region for temporarily holding decoding data of a specific image sequence; a memory region selection unit operable to select one of the individual memory regions in the memory, which memory region corresponds to a target image sequence to be decoded, on the basis of image identifying information which indicates the target image sequence; a decoding data transfer unit operable to transfer the decoding data of the target image sequence between the individual memory region selected by the memory region selection unit and the temporary memory region; and a decoder operable to perform decoding on the image data of the target image sequence on the basis of the decoding data stored in the temporary memory region. Therefore, as in the first aspect, decoding processes for the plural image sequences can be performed by a single decoder, and further, the computational complexity relating to a computation for specifying a storage region of decoding data which is required for decoding can be reduced. Moreover, since the memory regions for holding the decoding data of the respective image sequences are secured on the memory, even when the number of image sequences to be decoded is increased, it is possible to cope with such increase in the number of image sequences by allocating, on the memory, memory regions for holding decoding data of these image sequences, without altering the construction of the decoder.

According to a third aspect of the present invention, an image decoding apparatus is provided for decoding image data including plural image sequences. The image decoding apparatus of the third aspect comprises: a memory having plural memory regions corresponding to the respective image sequences, and being operable to hold decoding data including plural parameters to be used when the image data of the respective image sequences are decoded; a parameter storage position decision unit operable to decide storage positions of parameters in a memory region corresponding to a target image sequence to be decoded, which parameters are required when the target image sequence is decoded, and which decision is carried out on the basis of image identifying information which indicates the target image sequence; and a decoder operable to perform decoding on the target image sequence, on the basis of the parameters stored in the parameter storage positions which are decided by the parameter storage position decision unit. When decoding is carried out, the required parameters are read from the memory region in the memory corresponding to the target image sequence. Therefore, decoding processes for the plural image sequences can be carried out by a single decoder. Furthermore, since the parameters which are required for decoding are obtained by directly referring to the storage positions of the required parameters in the decoding data storage region in the memory corresponding to the target image sequence, the number of decoding data memory regions allocated on the memory are equal to the number of image sequences to be decoded, whereby the memory area to be used can be minimized.

According to a fourth aspect of the present invention, an image decoding method is provided for performing decoding on image data including plural image sequences, on the basis of decoding data of the respective image sequences. The image decoding method of the fourth aspect comprises: transferring decoding data corresponding to a target image sequence to be decoded, among the decoding data corresponding to the respective image sequences, between a memory for holding the decoding data of the respective image sequences and a temporary storage for temporarily holding decoding data of a specific image sequence; and decoding the image data corresponding to the target image sequence, with reference to the decoding data stored in the temporary storage. Therefore, as in the first aspect, decoding processes for the plural image sequences can be performed by a single decoder. Further, the computational complexity relating to a computation for specifying a storage region of decoding data which is required for decoding can be reduced. Moreover, even when the number of image sequences to be decoded is increased, it is possible to cope with such increase in the number of image sequences by allocating, on the memory, memory regions for holding decoding data of these image sequences, without altering the construction of the decoder.

According to a fifth aspect of the present invention, an image decoding method is provided for decoding image data including plural image sequences. The image decoding method of the fifth aspect comprises: selecting decoding data of a target image sequence to be decoded from decoding data including plural parameter data of the respective image sequences, which decoding data are stored in a memory and are to be used when the image data of the respective image sequences are decoded; deciding storage positions, in the memory, of parameter data required for decoding, among the plural parameter data constituting the selected decoding data; and decoding the image data corresponding to the target image sequence, on the basis of the parameter data stored in the decided storage positions. Therefore, as in the third aspect, when decoding is carried out, the required parameters are read from the memory region in the memory corresponding to the target image sequence. Therefore, decoding processes for the plural image sequences can be carried out by a single decoder. Furthermore, since the parameters which are required for decoding are obtained by directly referring to the storage positions of the required parameters in the decoding data storage region in the memory, corresponding to the target image sequence, the number of decoding data memory regions allocated on the memory are equal to the number of image sequences to be decoded, whereby the memory area to be used can be minimized.

According to a sixth aspect of the present invention, a program storage medium is provided which contains a program for making a computer perform data processing on image data including plural image sequences, on the basis of decoding data of the respective image sequences. The program storage medium of the sixth aspect contains a data processing program which makes the computer perform the following processes: a decoding data transfer process of transferring decoding data of a target image sequence to be decoded, among the decoding data of the respective image sequences, between a memory for holding the decoding data of the respective image sequences and a temporary storage for temporarily holding decoding data of a specific image sequence; and a decoding process of decoding the image data corresponding to the target image sequence, with reference to the decoding data stored in the temporary storage. Therefore, the image decoding method according to the fourth aspect can be realized by software.

According to a seventh aspect of the present invention, a program storage medium is provided which contains a program for making a computer perform data processing on image data including plural image sequences. The program storage medium of the seventh aspect contains a data processing program which makes the computer perform the following processes: a decoding data selection process of selecting decoding data of a target image sequence to be decoded from decoding data including plural parameter data corresponding to the respective image sequences, which decoding data are stored in a memory and are to be used when the image data of the respective image sequences are decoded; a parameter storage position decision process of deciding storage positions, in the memory, of parameter data which are required for decoding, among the plural parameter data constituting the selected decoding data; and a decoding process of decoding the image data corresponding to the target image sequence, on the basis of the parameter data stored in the storage positions which are decided in the parameter storage position decision step. Therefore, the image decoding method according to the fifth aspect can be realized by software.

BRIEF DESCRIPTION OF THE DRAWINGS

FIG. 14($a$) is a diagram illustrating coded image data of plural image sequences, and FIG. 14($b$) is a diagram illustrating a video stream in which the coded image data are multiplexed.

DETAILED DESCRIPTION OF THE PREFERRED EMBODIMENTS

Hereinafter, embodiments of the present invention will be described.

First Embodiment

Figure 1:
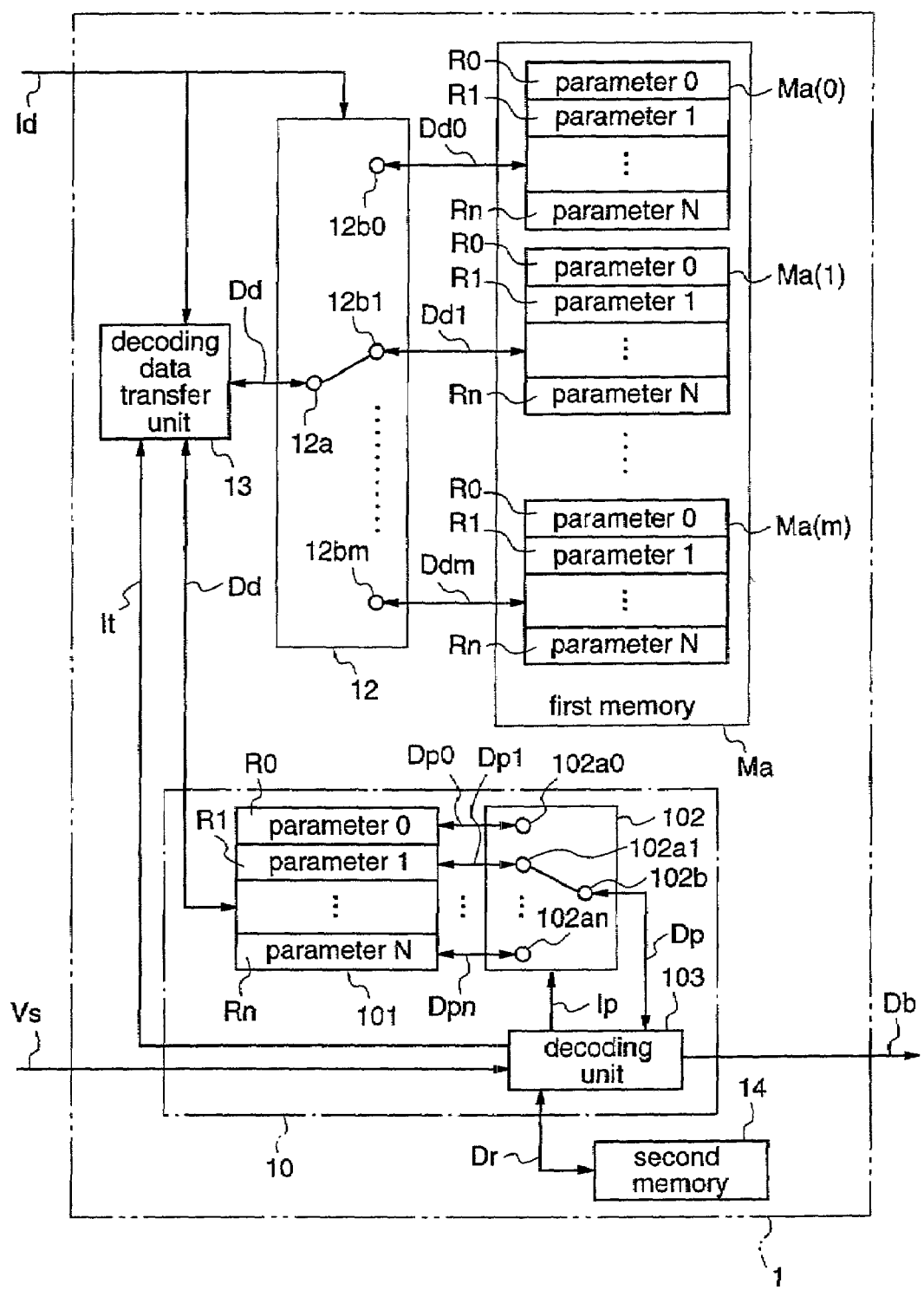
FIG. 1 is a block diagram for explaining an image decoding apparatus according to a first embodiment of the present invention.

FIG. 1 is a block diagram for explaining an image decoding apparatus 1 according to a first embodiment of the present invention.

The image decoding apparatus 1 according to this first embodiment receives a video stream Vs which is obtained by multiplexing image data corresponding to plural image sequences, and image sequence identifying information Id which indicates an image sequence corresponding to each image data inputted as the video stream Vs. The image decoding apparatus 1 performs decoding of the image data corresponding to each image sequence on the basis of the image sequence identifying information Id. The image data is data that is obtained by coding a digital image signal corresponding to the image sequence.

The image decoding apparatus 1 of this first embodiment is constructed so as to perform parallel decoding on image data corresponding to (m+1) image sequences included in the video stream Vs. The image sequence identifying information Id indicating a target image sequence to be decoded is supplied from a CPU (not shown) for controlling the image decoding apparatus 1 to the image decoding apparatus 1, in synchronization with the video stream Vs.

The image decoding apparatus 1 includes a decoder 10, a first memory Ma, and a second memory 14. To be specific, the decoder 10 extracts parameter data Dp as decoding data of each image sequence from the inputted video stream Vs, and decodes image data of an image sequence to be decoded (target image sequence), in predetermined units of data, on the basis of the decoding data Dd of the target image sequence which is specified by the image sequence identifying information Id of the inputted video stream Vs, with reference to already-decoded reference image data Dr as necessary, and outputs decoded image data Db corresponding to the target image sequence. The first memory Ma includes memory regions Ma(0), Ma(1), . . . , Ma(m) corresponding to the plural image sequences to be handled by the image decoding apparatus 1, and stores desired decoding data Dd extracted from each image sequence of the video stream Vs in each memory region. The second memory 14 holds the reference image data Dr to be referred to in the above-described decoding process.

The image decoding apparatus 1 further includes a decoding data transfer unit 13 and a memory region selector 12. The decoding data transfer unit 13 transfers the decoding data Dd corresponding to the target image sequence of the video stream Vs, between the first memory Ma and the decoder 10, on the basis of a timing signal It supplied from the decoder 10 and the image sequence identifying information Id. The memory region selector 12 is placed between the decoding data transfer unit 13 and the first memory Ma, and the memory region selector 12 connects the decoding data transfer unit 13 to one of the plural memory regions Ma(0)–Ma(m) in the first memory Ma, on the basis of the image sequence identifying information Id.

Assuming that the (m+1) image sequences included in the video stream Vs are image sequences Ob0–Obm, respectively, the memory regions Ma(0)–Ma(m) in the first memory Ma correspond to the image sequences Ob0–Obm, and decoding data Dd0, Dd1, . . . , Ddm corresponding to the (m+1) image sequences are stored in the memory regions Ma(0)–Ma(m), respectively.

As described above, each decoding data Dd comprises data Dp of (N+1) parameters 0–N, and the (N+1) pieces of parameter data Dp are stored in parameter storage positions R0–Rn corresponding to the (N+1) parameters in each of the memory regions Ma(0)–Ma(m). As an initial value to be stored in each of the parameter storage positions R0–Rn, a predetermined value, for example, a value depending on the coding method (MPEG2, MPEG4, or the like) or a value which is set as the operation of the whole image decoding apparatus (i.e., a value for setting the initial state of the image decoding apparatus), is given. Further, continuous addresses in an address area of the first memory Ma are set in the parameter storage positions R0–Rn.

In the respective memory regions Ma(0)–Ma(m) in the first memory Ma, the same kind of parameters are stored in the parameter storage positions R0–Rn whose relative positions from the head positions of the respective memory regions are identical. Further, the (N+1) pieces of parameter data Dp constituting each decoding data Dd are, for example, header information which corresponds to a data unit higher than a macroblock layer and indicates the width and height of a frame corresponding to the image data, the coding method for the image data, quantization parameters in the coding process of the image data, and the like; information indicating the storage position of the reference image data Dr which is stored in the second memory 14; and the like.

Further, the memory region selector 12 has a first terminal 12a for accessing the decoding data Dd between itself and the decoding data transfer unit 13, and second terminals 12b0, 12b1, . . . , 12bm connected to the decoding data storage regions (memory regions) Ma(0), Ma(1), . . . , Ma(n) corresponding to the respective image sequences in the first memory Ma. The selector 12 connects the first terminal 12a to any of the second terminals 12b0–12bm on the basis of the image sequence identifying information Id.

Further, the decoding data transfer unit 13 transfers the decoding data Dd which is stored in a desired memory region in the first memory Ma, to the decoder 10, on the basis of the image sequence identifying information Id. In addition, the transfer unit 13 transfers the decoding data Dd which is extracted from each image sequence of the video stream Vs and then stored by the decoder 10, to a memory region in the first memory Ma corresponding to the image sequence, on the basis of a timing signal It outputted from the decoder 10.

The decoder 10 includes a decoding unit 103, and a decoding data storage register 101. The decoding unit 103 analyzes the header information of the inputted video stream Vs to extract parameter data Dp corresponding to a target image sequence to be decoded, and generates parameter storage position information Ip identifying the extracted parameter data Dp. The decoding data storage register 101 holds decoding data Dd corresponding to the target image sequence, which data may be required in the decoding process by the decoding unit 103. Parameter storage positions R0–Rn corresponding to parameter data Dp of (N+1) parameters 0–N constituting the decoding data Dd are set in the decoding data storage register 101, and the corresponding data Dp of the parameters 0–N are stored in the parameter storage positions R0–Rn, respectively. The decoding unit 103 performs decoding on the inputted video stream Vs, on the basis of the decoding data Dd extracted from the video stream Vs and the decoding data Dd supplied from the first memory Ma, thereby generating the decoded image data Db.

Furthermore, the decoder 10 includes a parameter selector 102 placed between the decoding unit 103 and the decoding data storage register 101. The parameter selector 102 has a second terminal 102b for accessing parameter data Dp between itself and the decoding unit 103, and plural first terminals 102a0–102an corresponding to the respective parameter storage positions R0–Rn of the decoding data storage register 101. The parameter selector 102 connects the second terminal 102b to one of the first terminals 102a0–102an of the parameter selector 102 on the basis of the parameter storage position information Ip supplied from the decoding unit 103.

Hereinafter, a description will be given of the operation of the image decoding apparatus 1 according to the first embodiment of the present invention.

Figure 2:
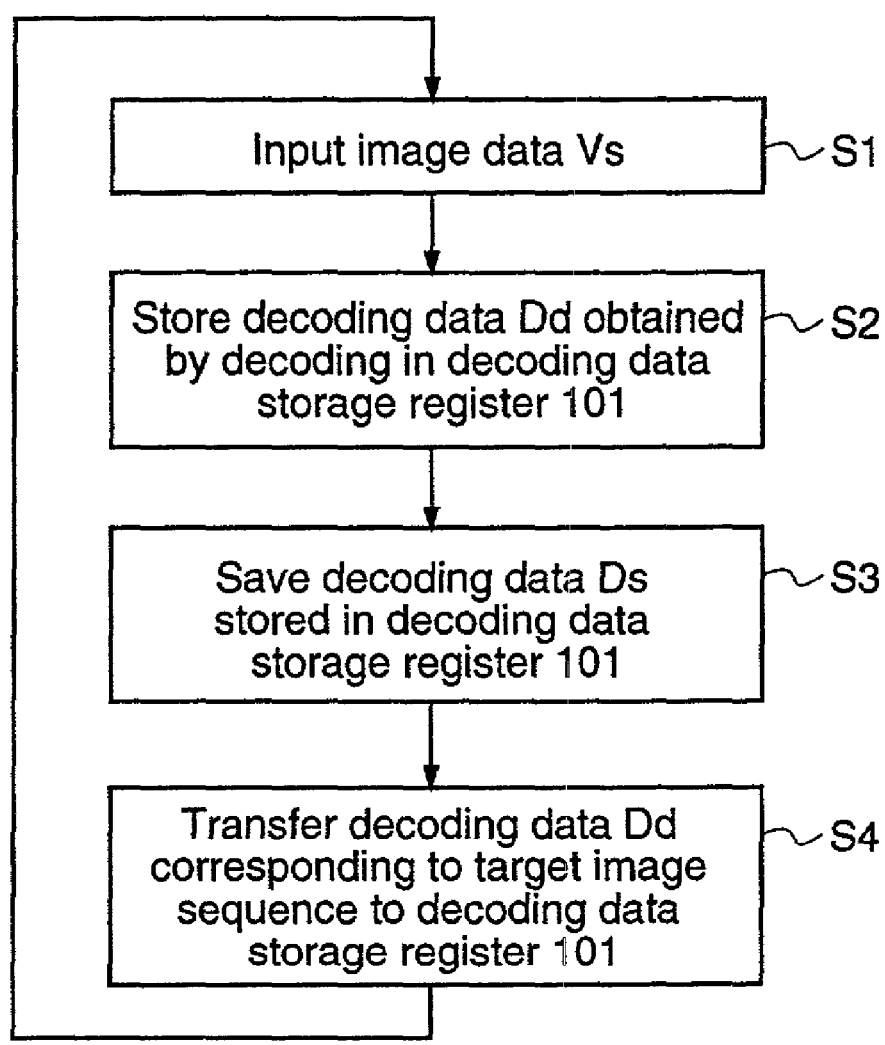
FIG. 2 is a flowchart for explaining the process of handling decoding data, according to the first embodiment.

FIG. 2 is a flowchart for explaining the operation of the image decoding apparatus 1.

Initially, when a video stream Vs obtained by multiplexing image data corresponding to plural image sequences is inputted, in predetermined units of data, to the image decoding apparatus 1, the image decoding apparatus 1 performs decoding on the video stream Vs, in the abovementioned units of data, on the basis of the video stream Vs and the image sequence identifying information Id which is inputted in synchronization with the video stream Vs. In this first embodiment, the predetermined units of data by which the video stream Vs is inputted are, for example, frames, and hereinafter, the units of data are sometimes referred to as frames.

To be specific, in the memory region selector 12, the first terminal 12a on the decoding data transfer unit 13 side is connected to any of the second terminals 12b0–12bm on the plural memory regions side in the first memory Ma, on the basis of the image sequence identifying information Id indicating an image sequence corresponding to the inputted video stream Vs. Then, the decoding data transfer unit 13 transfers the decoding data Dd in a predetermined memory region in the first memory Ma, which memory region is selected by the memory region selector 12, to the decoding data storage register 101 in the decoder 10, on the basis of the image sequence identifying information Id. For example, when the inputted video stream Vs corresponds to the image sequence Ob(0), the decoding data Dd0 stored in the memory region Ma(0) in the first memory Ma is transferred to the decoding data storage register 101 in the decoder 10. When the video stream Vs inputted to the image decoding apparatus 1 corresponds to the head frame of the image sequence Ob(0), the initial value of the decoding data Dd0, which has previously been stored in the memory region Ma(0), is transferred to the decoding data storage register 101.

On the other hand, when the image data corresponding to the predetermined image sequence is inputted as the video stream Vs to the decoder 10 (step S1), the decoding unit 103 in the decoder 10 analyzes the header of the image sequence to be decoded, whereby the data Dp0–Dpn corresponding to plural parameters 0–N (parameter data) are sequentially extracted as decoding data, and the parameter storage position information Ip indicating the kinds of the respective parameters is outputted.

The number of parameter data to be extracted from the video stream Vs depends on the contents of processing to be performed at that time, the conditions of coding to be performed on the inputted video stream Vs, and the like. Further, amongst the parameter data so extracted, the number of parameter data Dp to be stored in the decoding data storage register 101 (e.g., parameter data to be referred to after being extracted, parameter data to be referred to in the following decoding process, etc.) is N+1 at maximum. That is, the parameter data extracted from the video stream Vs include some parameter data which are required only in the decoding process, and there is no need to store these parameter data. Therefore, these parameter data are not stored in the decoding data storage register 101. Further, the reason why the number of parameter data Dp to be stored is N+1 at maximum is because, in the case of MPEG, there are parameter data which are not included in an I frame (intra-frame coded frame) but are included in a P frame (forward predictive coded frame) among the parameter data Dp to be stored.

At this time, in the parameter selector 102, the second terminal 102b on the decoding unit 103 side is sequentially connected to a predetermined terminal selected from the first terminals 102a0–102an on the decoding data storage register 101 side, on the basis of the parameter storage position information Ip, and the parameter data Dp extracted from the video stream Vs are sequentially stored in the corresponding parameter storage regions R0–Rn in the decoding data storage register 101 (step S2).

To be specific, when a video stream Vs corresponding to an initial data unit (frame) of one image sequence is inputted, analysis of header information corresponding to the whole image sequence as well as analysis of header information corresponding to the data unit are carried out, and parameter data Dp corresponding to the whole image sequence as well as parameter data Dp corresponding to the data unit are extracted as decoding data. Further, when a video stream Vs corresponding to a second or subsequent data unit (frame) of one image sequence is inputted, only analysis of header information corresponding to the data unit is carried out, and only parameter data Dp corresponding to the data unit is extracted as decoding data.

When the inputted video stream Vs is a stream which has been subjected to inter-frame predictive coding (for example, when the video stream Vs corresponds to a P frame or a B frame based on MPEG2), the decoding unit 103 decodes the video stream Vs, with reference to the reference image data Dr stored in the second memory 14, on the basis of the decoding data Dd including the (N+1) pieces parameter data Dp which are stored in the decoding data storage register 101. On the other hand, when the inputted video stream Vs is a stream which has been subjected to intra-frame coding (i.e., when the video stream Vs corresponds to an I frame), the decoding unit 103 decodes the video stream Vs without referring to the reference image data Dr stored in the second memory 14.

After the above-described decoding process is completed the same data as the decoded image data Db obtained in the decoding process is stored as reference image data Dr in the second memory 14. Further, in this decoding process, amongst the parameter data Dp which are obtained by analyzing the header corresponding to the image sequence or the header corresponding to the data unit, those parameters to be temporarily stored during the decoding process corresponding to the data unit by which the video stream Vs is inputted, are also stored in the second memory 14.

When the decoding of the inputted frame in the image sequence to be decoded (target image sequence) is completed and header information of the next frame is detected, a timing signal It is outputted from the decoding unit 103 to the decoding data transfer unit 13. Upon receipt of the timing signal It, the decoding data transfer unit 13 transfers the decoding data Dd stored in the decoding data storage register 101 in the decoder 10 to the memory region in the first memory Ma, which memory region corresponds to the target image sequence (step S3). Thereby, with respect to the target image sequence corresponding to the decoded frame, the decoding data Dd in the memory region corresponding to the target image sequence is updated. For example, the respective parameter data Dp constituting the decoding data Dd0 corresponding to the memory region Ma(0) are updated from the initial values to the values obtained in the decoding process.

When a video stream Vs corresponding to the next frame is inputted, the decoding data Dd stored in a desired memory region in the first memory Ma is transferred to the decoding data storage register 101 in the decoder 10, on the basis of the image sequence identifying information Id corresponding to this frame (step S4).

For example, when the video stream Vs corresponding to the second inputted frame corresponds to the image sequence Ob(1), the initial value which has previously been stored in the memory region Ma(1) in the first memory Ma is transferred as decoding data Dd1 to the decoding data storage register 101 in the decoder 10. On the other hand, when the video stream Vs corresponding to the second inputted frame corresponds to the image sequence Ob(0) like the previous frame, the most-recently updated value, which is stored in the memory region Ma(0) in the first memory Ma, is transferred as decoding data Dd0 to the decoding data storage register 101 in the decoder 10.

Thereafter, the same process as that in the case where the video stream Vs corresponding to the first frame is inputted, is carried out.

Accordingly, in the above-described decoding process, the respective parameter data Dp which are stored as decoding data Dd in the decoding data storage register 101 are updated every time a video stream Vs corresponding to each inputted frame is decoded.

As described above, the image decoding apparatus 1 according to the first embodiment is provided with the decoder 10 which includes the decoding data storage register 101 for holding decoding data Dd including parameter data Dp corresponding to a data unit to be decoded (target frame), the decoder 10 decodes a video stream Vs corresponding to the target frame on the basis of the decoding data Dd stored in the decoding data storage register 101, and the first memory Ma which has the memory regions Ma(0)–Ma(m) where the decoding data Dd0–Ddm corresponding to plural image sequences in the video stream Vs are stored. The decoding data Dd is transferred between the decoding data storage register 101 in the decoder 10 and a predetermined memory region in the first memory Ma, according to the detection that the target frame corresponds to any of the image sequences. Therefore, it is possible to perform parallel decoding on the video streams Vs corresponding to the plural image sequences by using the single decoder 10. Further, when the decoding data storage register 101 is constituted by a quick access storage such as a cache or a SRAM, the performance of the image decoding apparatus can be enhanced. Moreover, even when the number of image sequences included in the video stream Vs is increased, regions for storing decoding data Dd corresponding to the increased image sequences can be easily provided by assigning memory regions for storing the decoding data corresponding to the increased image sequences within the range of the capacity of the first memory Ma.

Furthermore, in the image decoding apparatus according to the first embodiment, the plural parameter data Dp constituting the decoding data Dd of the target image sequence extracted from the video stream Vs is transferred between the decoding data storage register 101 in which the storage positions for the respective parameters are set, and the memory region in the first memory Ma corresponding to the target image sequence. Therefore, even when the target image sequence is changed during the decoding process in the decoding unit 103, the parameter storage positions in each decoding data storage region (memory region) in the first memory Ma are not changed, whereby the computational complexity relating to the parameter storage positions when the target image sequence is changed can be reduced.

In the first embodiment, as long as the capacity of the first memory Ma is not changed, the number of image sequences that can be the targets of decoding is restricted to the number of the securable storage regions (memory regions) for the decoding data Dd in the first memory Ma. Accordingly, in order to increase the number of the memory regions (decoding data storage regions) over the capacity of the first memory Ma, the capacity itself of the first memory Ma should be increased.

Further, in the first embodiment, the first memory Ma for storing the decoding data, and the second memory 14 for storing the data other than the decoding data (e.g., the data to be temporarily stored, the reference image data Dr, and the like) are separated memories. However, the first and second memories may be implemented as a single memory. In this case, a region where the decoding data are stored and a region where the data other than the decoding data are stored should be allocated on this single memory.

Furthermore, in the first embodiment, the memory regions (decoding data storage regions) Ma(0)–Ma(m) corresponding to all of the image sequences to be decoded are allocated on the first memory Ma, the decoder 10 is provided with the decoding data storage register (dedicated register) 101 for holding all of the parameter data Dp constituting the decoding data Dd corresponding to the target frame, and the decoding data Dd is transferred between the dedicated register and the memory regions in the first memory Ma. However, the constructions of the first memory Ma and the decoder 10 are not restricted thereto.

Modification of First Embodiment

Next, a description will be given of a modification of the first embodiment, wherein the constructions of the decoder 10, the first memory Ma and the like of the image decoding apparatus 1 according to the first embodiment are altered.

Figure 3:
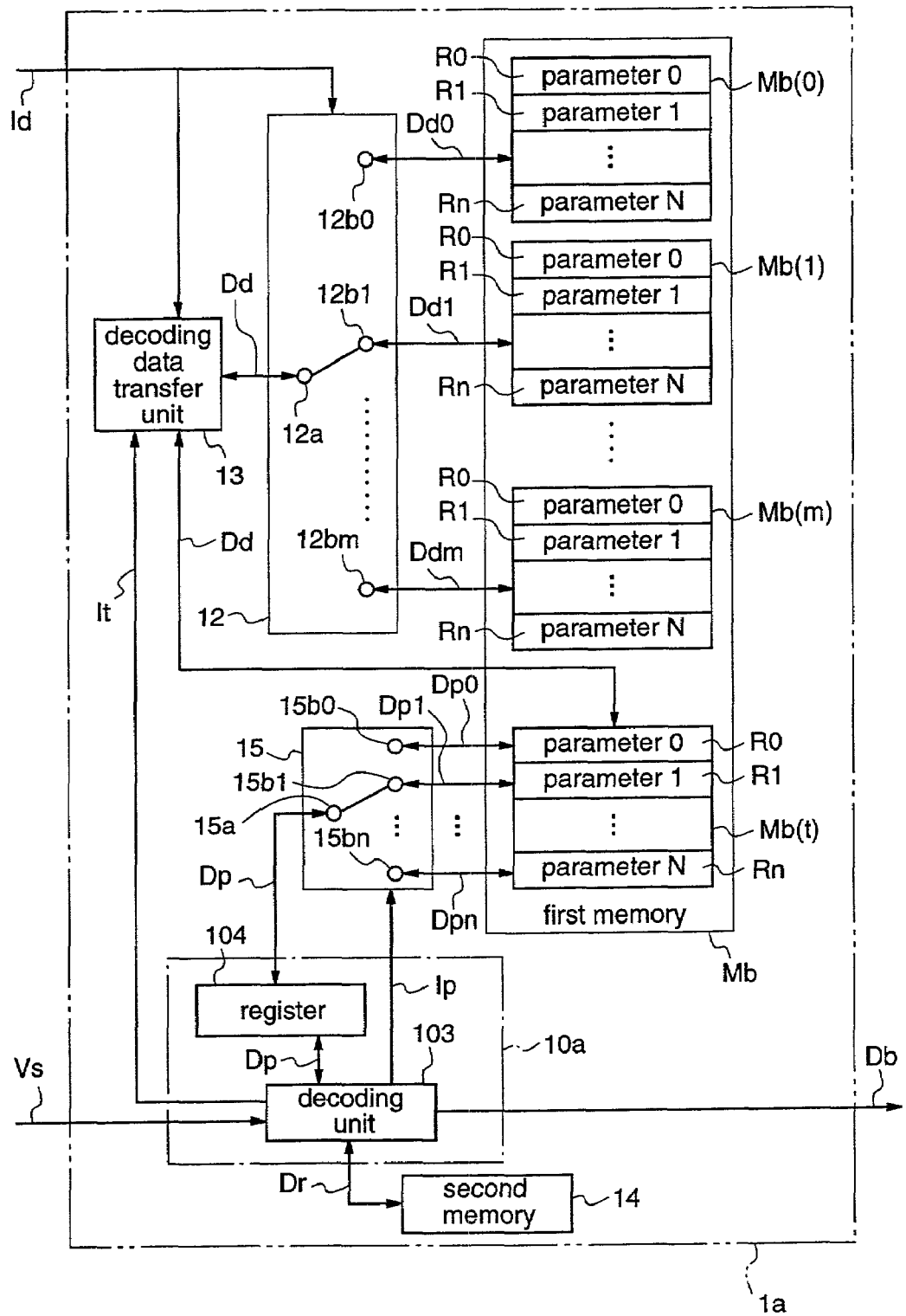
FIG. 3 is a block diagram for explaining an image decoding apparatus according to a modification of the first embodiment.

FIG. 3 is a block diagram for explaining an image decoding apparatus 1a according to the modification of the first embodiment.

The image decoding apparatus 1a according to the modification of the first embodiment is provided with, instead of the first memory Ma employed in the image decoding apparatus 1 of the first embodiment, a first memory Mb having a data storage region (temporary memory region) Mb(t) wherein all parameter data Dp constituting decoding data Dd of a target image sequence to be decoded are stored, in addition to memory regions (individual memory regions) Mb(0)–Mb(m) wherein decoding data Dd corresponding to all decodable image sequences are stored. Further, the image decoding apparatus 1a is provided with, instead of the decoder 10 employed in the image decoding apparatus 1, a decoder 10a including a register 104 for holding a part of all parameter data Dp stored in the temporary memory region Mb(t), and a decoding unit 103 for decoding a video stream Vs corresponding to the target image sequence on the basis of the parameter data Dp stored in the register 104.

Further, the image decoding apparatus 1a includes a parameter selector 15 for selecting one of parameter storage positions R0–Rn in the temporary memory region Mb(t) on the basis of parameter storage position information Ip, thereby enabling access to the parameter data Dp between the selected parameter storage position and the register 104.

The parameter selector 15 has a first terminal 15a for accessing the parameter data Dp between itself and the register 104, and plural second terminals 15b0–15bn corresponding to the respective parameter storage positions R0–Rn in the temporary memory region Mb(t). The parameter selector 15 connects the first terminal 15a to one of the second terminals 15b0–15bn on the basis of the parameter storage position information Ip outputted from the decoding unit 103.

Other constituents of the image decoding apparatus 1a according to the modification of the first embodiment are identical to those of the image decoding apparatus 1 of the first embodiment.

Next, a description will be given of the operation of the image decoding apparatus 1a constructed as described above.

When a video stream Vs corresponding to a predetermined frame is inputted to the image decoding apparatus 1a, the memory region selector 12 selects an individual memory region in the first memory Mb, which region corresponds to an image sequence including this frame, on the basis of the image sequence identifying information Id. Further, the decoding data transfer unit 13 transfers decoding data Dd stored in the selected individual memory region to the temporary memory region Mb(t).

At this time, in the decoder 10a, parameter data Dp which is obtained by header analysis in the decoding unit 103 is temporarily stored in the register 104 and, thereafter, the stored parameter data Dp is transferred to a predetermined parameter storage position (any of R0–Rn) in the temporary memory region Mb(t) in the first memory Mb, through the parameter selector 15, on the basis of the parameter storage position information Ip. Then, decoding of the predetermined frame is carried out on the basis of the parameter data Dp stored in the register 104. In this decoding process, required parameter data Dp other than the parameter data Dp stored in the register 104 are transferred from the temporary memory region Mb(t) to the register 104.

When the decoding process is completed, the parameter data Dp stored in the temporary memory region Mb(t) of the first memory Mb is transferred to a decoding data storage region (individual memory region) in the first memory Mb, which region corresponds to the image sequence including the target frame, according to a timing signal It supplied from the decoder 10a.

Thereafter, when a video stream Vs corresponding to the next frame is inputted, decoding data stored in an individual memory region corresponding to a predetermined image sequence is transferred to the temporary memory region Mb(t) in the first memory Mb on the basis of the image sequence identifying information Id, and the same decoding process as described above is carried out.

The image decoding apparatus according to the first embodiment or the modification of the first embodiment can be implemented in a computer system by using software which is programmed so that a CPU (Central Processing Unit) performs the functions of the constituents of the image decoding apparatus, such as the decoder 10 (10a), the decoding data transfer unit 13, the memory region selector 12, the parameter selector 15 (102), and the like.

Also when the image decoding apparatus according to the first embodiment or the modification of the first embodiment is implemented by software, the same effects as obtained by the first embodiment or the modification of the first embodiment are achieved. The above-described software program can be stored in storage media such as a floppy disk, an optical disk, an IC card, a ROM cassette, etc.

Second Embodiment

Figure 4:
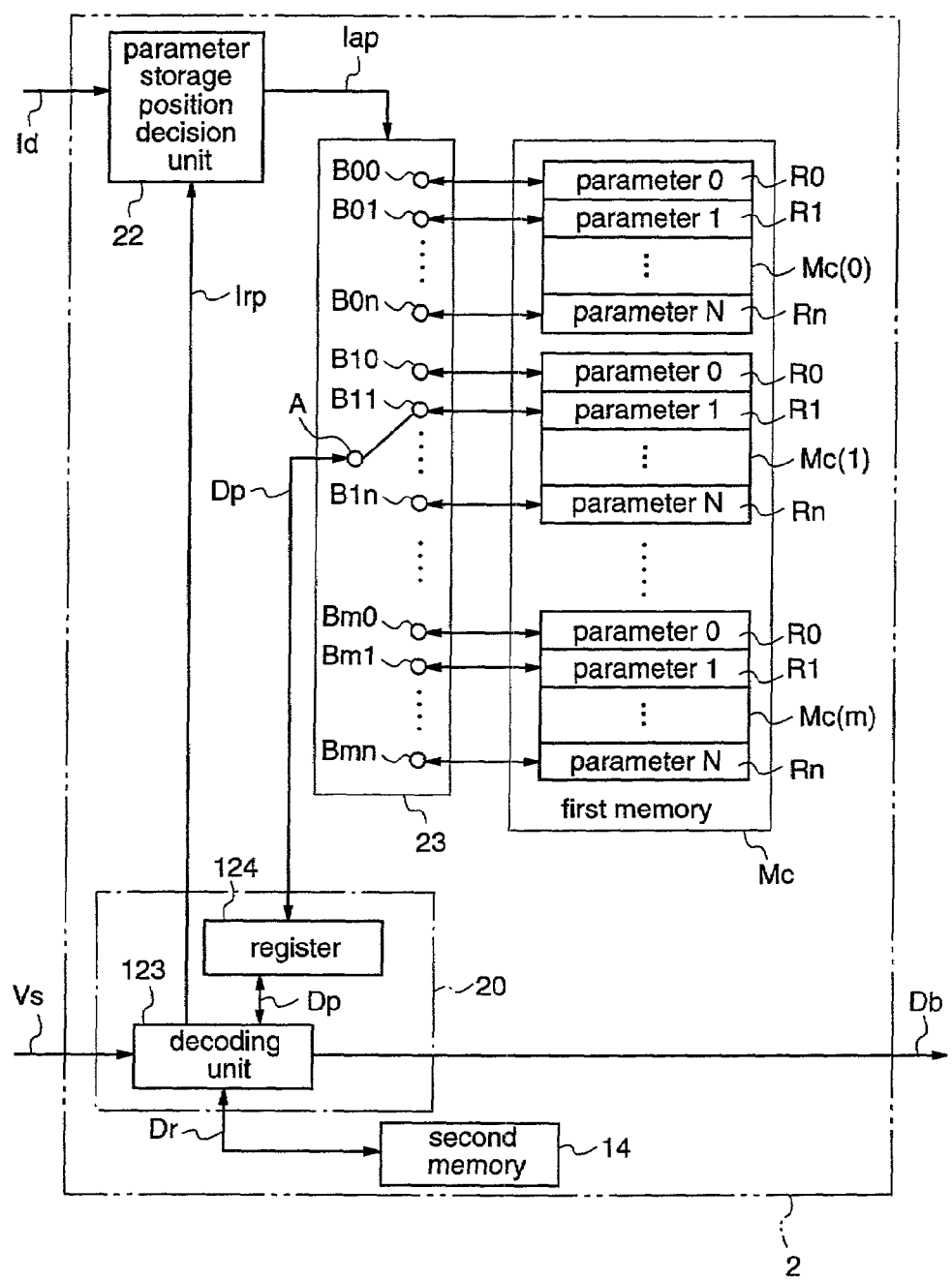
FIG. 4 is a block diagram for explaining an image decoding apparatus according to a second embodiment of the present invention.

FIG. 4 is a block diagram for explaining an image decoding apparatus 2 according to a second embodiment of the present invention.

The image decoding apparatus 2 according to this second embodiment receives a video stream Vs which is obtained by multiplexing image data corresponding to plural image sequences, and image sequence identifying information Id indicating an image sequence corresponding to each image data inputted as the video stream Vs. The image decoding apparatus 2 performs decoding of the image data corresponding to each image sequence on the basis of the image sequence identifying information Id. The image data is obtained by encoding a digital image signal corresponding to the image sequence.

The image decoding apparatus 2 according to this second embodiment is constructed so as to perform parallel decoding on image data corresponding to (m+1) image sequences which are included in the video stream Vs. The image sequence identifying information Id which indicates a target image sequence to be decoded is supplied from a CPU (not shown) for controlling the image decoding apparatus 2, to the image decoding apparatus 2, in synchronization with the video stream Vs.

The image decoding apparatus 2 includes a decoder 20, a first memory Mc, and a second memory 14. To be specific, the decoder 20 extracts parameter data Dp of each image sequence from the inputted video stream Vs, and performs decoding on image data Vs of a target image sequence, in predetermined units of data, on the basis of decoding data Dd of the target image sequence which is specified by the image sequence identifying information Id of the inputted video stream Vs, with reference to already-decoded reference image data Dr as necessary, and outputs decoded image data Db corresponding to the target image sequence. The first memory Mc includes memory regions (data storage regions) Mc(0), Mc(1), . . . , Mc(m) corresponding to the respective image sequences to be handled by the image decoding apparatus 2, and stores desired decoding data Dd in each memory region. The second memory 14 stores the reference image data Dr to be referred to in the above-described decoding process.

Assuming that the (m+1) image sequences included in the video stream Vs are image sequences Ob0–Obm, respectively, the memory regions Mc(0)–Mc(m) in the first memory Mc correspond to the image sequences Ob0–Obm, and decoding data Dd0, Dd1, . . . , Ddm corresponding to the (m+1) image sequences are stored in the memory regions Ma(0)–Ma(m), respectively.

Each decoding data Dd comprises data Dp of (N+1) parameters 0–N, and the (N+1) pieces of parameter data Dp are stored in parameter storage positions R0–Rn corresponding to the (N+1) parameters in each of the memory regions Mc(0)–Mc(m). An initial value stored in each of the parameter storage positions R0–Rn is a predetermined value, for example, a value depending on the coding method (MPEG2, MPEG4, or the like) or a value which is set as the operation of the whole image decoding apparatus (i.e., a value for setting the initial state of the image decoding apparatus). Further, continuous addresses in an address area of the first memory Mc are set in the parameter storage positions R0–Rn.

In the respective memory regions Mc(0)–Mc(m) in the first memory Mc, the same kind of parameters are stored in the parameter storage positions R0–Rn whose relative positions from the head positions of the respective memory regions are identical. Further, the (N+1) pieces of parameter data Dp constituting each decoding data Dd are, for example, header information which corresponds to a data unit higher than a macroblock layer and indicates the width and height of a frame corresponding to the image data, the coding method for the image data, quantization parameters in the coding process for the image data, and the like; and information indicating the storage position of the reference image data Dr which is stored in the second memory 14; and the like.

Further, the decoder 20 comprises a decoding unit 123, and a register 124. The decoding unit 123 extracts various kinds of parameter data Dp as decoding data corresponding to a target image sequence to be decoded by analyzing the header information of the inputted video stream Vs, and generates parameter relative storage position information Irp for discriminating between the parameters. The register 124 stores the parameter data Dp corresponding to the target image sequence, which parameter data may be required in the decoding process by the decoding unit 123. The register 124 is provided with storage units for holding several parameters, and the parameter data Dp to be required in the decoding process are stored in the storage units. Further, the decoding unit 123 performs decoding on the inputted video stream Vs on the basis of the parameter data Dp extracted from the video stream Vs and the parameter data Dp supplied from the first memory Mc, thereby generating decoded image data Db.

Further, the image decoding apparatus 2 includes a parameter storage position decision unit 22, and a parameter storage position selection unit 23. The parameter storage position decision unit 22 decides the absolute storage position of the parameter data in the first memory Mc on the basis of the image sequence identifying information Id corresponding to each image sequence and the parameter relative storage position information Irp supplied from the decoding unit 123 of the decoder 20, and outputs parameter absolute storage position information Iap indicating this absolute storage position. The parameter storage position selection unit 23, which is placed between the decoder 20 and the first memory Mc, specifies any of the parameter storage positions R0–Rn in the memory regions Mc(0)–Mc(m) wherein the decoding data of the respective image sequences are stored, on the basis of the parameter absolute storage position information Iap to enable access to the parameter data Dp between the specified parameter storage position and the register 124 of the decoder 20. The parameter storage position selection unit 23 includes a first terminal A for accessing the parameter data Dp between itself and the register 124, and second terminals B00–B0$n$, B10–B1$n$, . . . , Bm0–Bm$n$ corresponding to the respective parameter storage positions R0–Rn in the decoding data storage regions (memory regions) Mc(0), Mc(1), . . . , Mc(m) in the first memory Mc. The parameter storage position selection unit 23 connects the first terminal A to any of the second terminals B00–B0$n$, B10–B1$n$, . . . , Bm0–Bm$n$.

Figure 5:
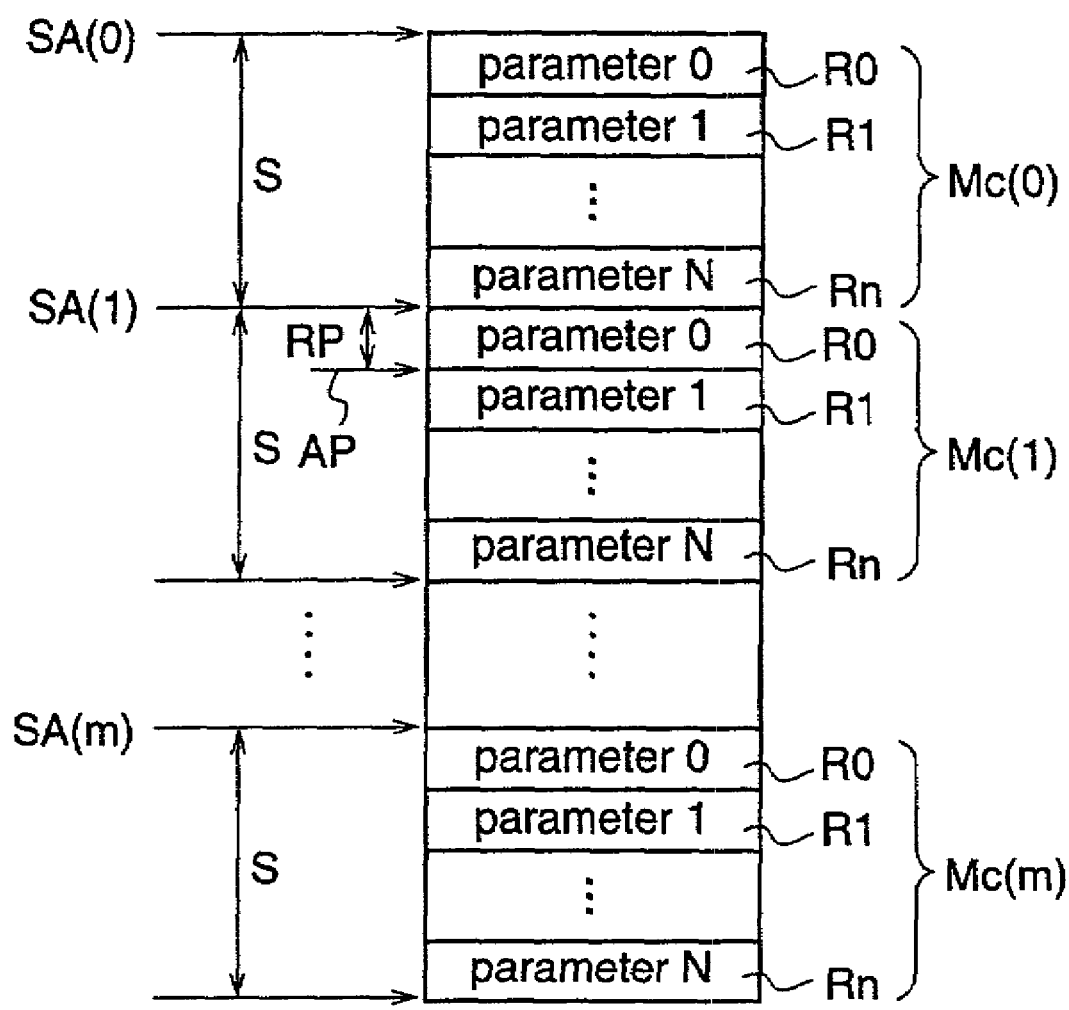
FIG. 5 is a diagram for explaining memory regions in a first memory which is a component of the image decoding apparatus of the second embodiment.

FIG. 5 is a diagram for a supplemental explanation on the construction of the first memory Mc.

In the first memory Mc, the memory regions Mc(0)–Mc(m) for holding the decoding data corresponding to the respective image sequences have a predetermined data storage size S, and the storage positions of parameter 0 in the memory regions Mc(0), Mc(1), . . . , Mc(m) correspond to the head positions SA(0), SA(1), . . . , SA(m) of the respective memory regions, respectively.

Accordingly, the following formula (1) holds.

$$SA(i+1)=SA(i)+S \text{ [}i: 0\text{–}m \text{ (m is positive integer)]} \qquad (1)$$

Next, a description will be given of the operation of the image decoding apparatus 2 constructed as described above.

When a video stream Vs obtained by multiplexing image data corresponding to plural image sequences is inputted in predetermined units of data (frames) to the image decoding apparatus 2, decoding of the video stream Vs is performed in the above-mentioned units of data, on the basis of the video stream Vs and the image sequence identifying information Id which is inputted in synchronization with the video stream Vs.

To be specific, in the decoding unit 123 of the decoder 20, analysis of the header corresponding to a target frame to be decoded is carried out on the basis of the inputted video stream Vs, and various kinds of parameter data Dp are sequentially generated as decoding data. At this time, in the decoding unit 123, parameter data Dp is generated and, simultaneously, parameter relative storage position information Irp indicating the type of the generated parameter data Dp is also generated. The parameter relative storage position information Irp indicates the storage position RP in the memory region which stores one decoding data of the generated parameter data Dp, relative to the head parameter storage position SA.

The parameter data Dp so generated is stored in the register 124, and the parameter relative storage position information Irp is outputted to the parameter storage position decision unit 22. In the parameter storage position decision unit 22, the absolute storage position AP of the parameter is decided on the basis of the image sequence identifying information Id and the parameter relative storage position information Irp, and parameter absolute storage position information Iap indicating the decided absolute storage position is outputted to the parameter storage position selection unit 23.

Then, the first terminal A of the parameter storage position selection unit 23 is connected to a predetermined terminal among the plural second terminals B00–Bmn Thereby, the parameter data Dp stored in the register 124 is transferred to the predetermined parameter storage position in the first memory Mc. All of the parameter data Dp extracted in the decoding process for one frame are stored in the parameter storage positions R0–Rn in any of the decoding data storage regions (memory regions) Mc(0)–Mc(m) corresponding to the image sequence including the frame.

After all of the parameter data Dp corresponding to the target frame in the predetermined image sequence have been stored in the memory region (decoding data storage region) corresponding to the image sequence, the decoding unit 123 decodes the target frame by using the parameter data Dp stored in the memory region.

To be specific, when decoding the target frame, the parameter relative storage position information Irp indicating the parameter that is required for this decoding process is outputted from the decoding unit 123 to the parameter storage position decision unit 22. In the parameter storage position decision unit 22, the parameter absolute storage position AP is decided on the basis of the image sequence identifying information Id and the parameter relative storage position information Irp. Then, the parameter storage position selection unit 23 selects the parameter storage position AP indicated by the parameter absolute storage position information Iap supplied from the parameter storage position decision unit 22. Thereby, the parameter data Dp required for decoding of the target frame is transferred from the first memory Mc to the register 124. Thereafter, in the decoding unit 123, decoding of the target frame is carried out on the basis of the parameter data Dp stored in the register 124, by referring to the reference image data Dr stored in the second memory 14 as necessary, whereby decoded image data Db corresponding to this frame is outputted.

When the target frame is an I frame, decoding of this frame is carried out without referring to the reference image data Dr stored in the second memory 14.

Subsequently, when a video stream Vs of a frame constituting the image sequence Ob(1) is inputted, decoding data (plural pieces of parameter data Dp) obtained by analyzing the header of this video stream Vs is stored in the memory region Mc(1) in the first memory Mc, which region corresponds to this image sequence Ob(1). Then, decoding of a target frame in this D image sequence is carried out on the basis of the parameter data Dp which is read from the memory region Mc(1) in the first memory Mc to the register 124.

In the process of decoding a subsequent frame which is included in the same image sequence where the previously decoded frame is included, the parameter values used when the previous frame was decoded may be compared with the parameter values which are to be written now, and only the parameter data Dp whose values are changed may be written in the corresponding memory regions in the first memory Mc.

Hereinafter, a brief description will be given of the operation for deciding the absolute parameter storage position AP in the parameter storage position decision unit 22.

Figure 6:
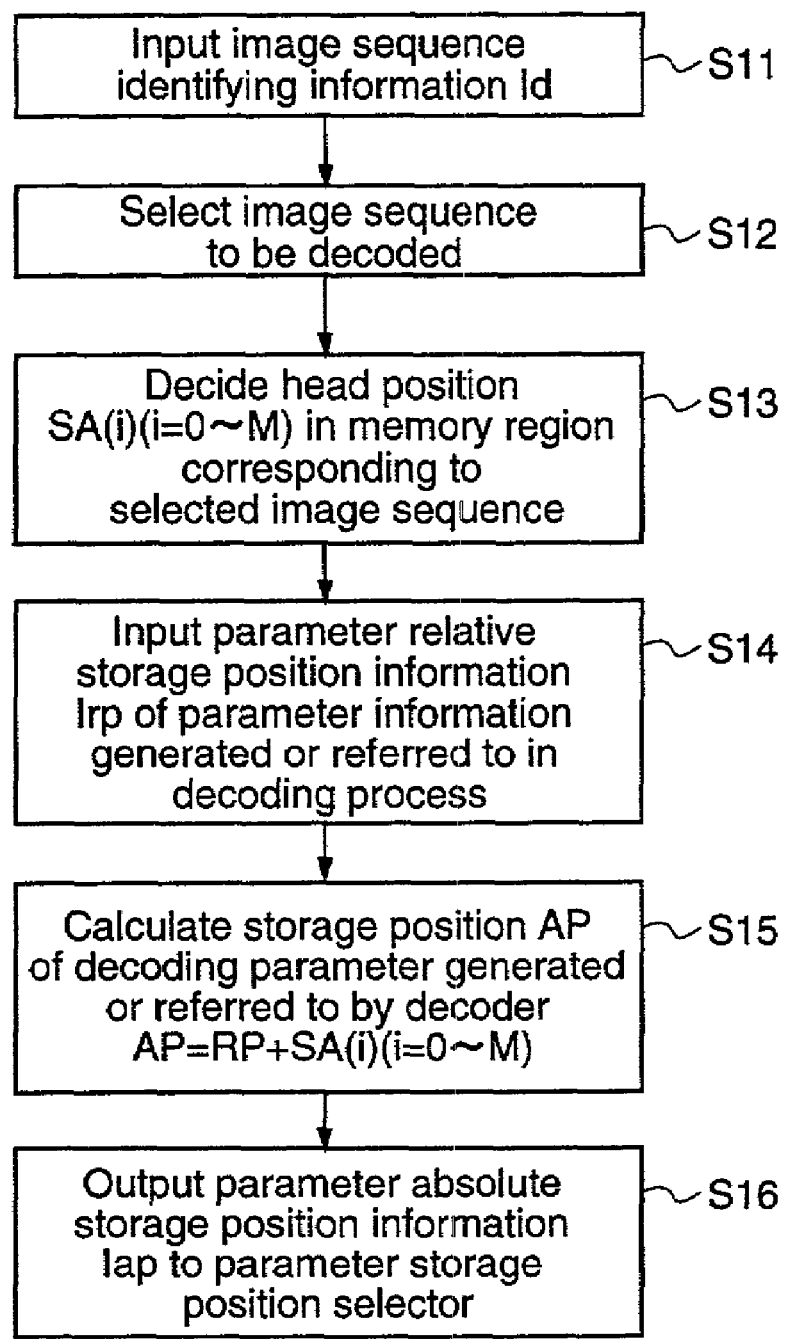
FIG. 6 is a flowchart for explaining the process of handling decoding data, according to the second embodiment.

FIG. 6 is a flow chart for explaining the operation of the parameter storage position decision unit 22.

Initially, when the image sequence identifying information Id indicating a target image sequence to be decoded is inputted to the parameter storage position decision unit 22 (step S11), the parameter storage position decision unit 22 selects a target image sequence on the basis of the image sequence identifying information Id (step S12), whereby a head position SA(i) (i=0–M) of a decoding data storage region (memory region) in the first memory Mc, which region corresponds to the target image sequence, is decided (step S13).

Next, when the parameter data Dp is obtained as decoding data in the decoding process by the decoding unit 123 of the decoder 20, the parameter relative storage position Irp indicating the relative storage position RP of this parameter data Dp is outputted to the parameter storage position decision unit 22 (step S14).

Then, in the parameter storage position decision unit 22, the parameter absolute storage position information Iap indicating the absolute storage position AP of the parameter data Dp extracted by the decoding unit 123 is derived on the basis of the image sequence identifying information Id indicating the head position SA(i) (i=0–M) of the memory region corresponding to the target image sequence, and the parameter relative storage position information Irp indicating the relative storage position RP of the parameter data Dp.

To be specific, the absolute storage position AP of the parameter data Dp in the first memory Mc is derived by adding the head position SA(i) (i=0–M) of the decoding data storage region (memory region) corresponding to the target image sequence, to the relative storage position RP of the parameter data Dp indicated by the parameter relative storage position information Irp supplied from the decoding unit 123.

Then, the parameter data Dp stored in the register 124 in the decoder 20 is stored in the parameter storage position in the first memory Mc, which position is specified by the parameter storage position selection unit 23.

In the decoding unit 123, every time the parameter data Dp is obtained as decoding data corresponding to a frame by analyzing the header of the frame, the parameter data Dp is transferred from the register 124 to the first memory Mc as described above. Further, when the parameter data Dp is referred to in the decoding process by the decoding unit 123 as decoding data, the storage position of the desired parameter data Dp in the first memory Mc is decided as described above, and the parameter data Dp is transferred from the first memory Mc to the register 124. When decoding each frame, the parameter data Dp corresponding to each image sequence is updated to the parameter data Dp corresponding to the latest frame.

In the parameter storage position decision unit 22, every time the decoding of one frame in the decoder 20 is ended, a data storage region corresponding to the target image sequence to be decoded is selected on the basis of the image sequence identifying information Id which indicates the image sequence corresponding to the target frame.

As described above, the image decoding apparatus 2 according to the second embodiment is provided with the decoder 20 which includes the register 124 for storing parameter data Dp that is obtained by analysis of the header of a frame or parameter data Dp to be required for decoding, and performs decoding of a target frame on the basis of the parameter data Dp stored in the register 124. Further, in the image decoding apparatus 2 od the second embodiment, the first memory Mc has memory regions Mc(0)–Mc(m) for storing decoding data including plural pieces of parameter data Dp corresponding to plural image sequences. A parameter storage position in the first memory Mc is specified according to the target frame, and the parameter data Dp is transferred between the register 120 in the decoder 20 and the specified parameter storage position in the first memory Mc. Therefore, even when the target image sequence is changed during decoding of the inputted video stream Vs, storage/readout of the parameter data Dp of the target image sequence in/from the first memory Mc can be performed by using the register 124, whereby parallel decoding of plural image sequences can be carried out using the single decoder 20. Further, since the parameter data Dp required for decoding the target image sequence is transferred one by one from the first memory Mc to the register 124 when the target image sequence is decoded, the number of parameter data Dp stored in the register 124 in the decoder 20 is reduced, resulting in saving in the capacity of the register 124.

Further, even when the number of image sequences to be decoded is increased, additional memory regions can be easily secured by allocating memory regions for decoding data corresponding to the increased image sequences within the range of the capacity of the first memory Mc.

In this second embodiment, when an absolute storage position AP of parameter data is derived in the parameter storage position decision unit 22, a target image sequence to be decoded is always decided on the basis of the image sequence identifying information Id. However, the method of deriving the parameter absolute storage position information Iap is not restricted thereto.

For example, when a video stream Vs of a first frame corresponding to each image sequence is inputted, the parameter storage position decision unit 22 may derive the parameter absolute storage position information Iap as follows. That is, a target image sequence to be decoded is selected on the basis of the image sequence identifying information Id corresponding to the first frame, the head position information which indicates the head position SA of a memory region for holding the decoding data corresponding to the selected image sequence is stored, and the parameter absolute storage position information Iap corresponding to each parameter data Dp to be used as decoding data when a subsequent frame is decoded is derived on the basis of the head position information that is stored. In this case, the parameter storage position decision unit 22 decides the head position SA of the memory region only when the parameter storage position decision unit 22 is given the image sequence identifying information Id of a new target image sequence, and updates the stored information indicating the head position SA of the memory region. Thereby, the computational complexity in the parameter storage position decision unit 22 is reduced.

Third Embodiment

Figure 7:
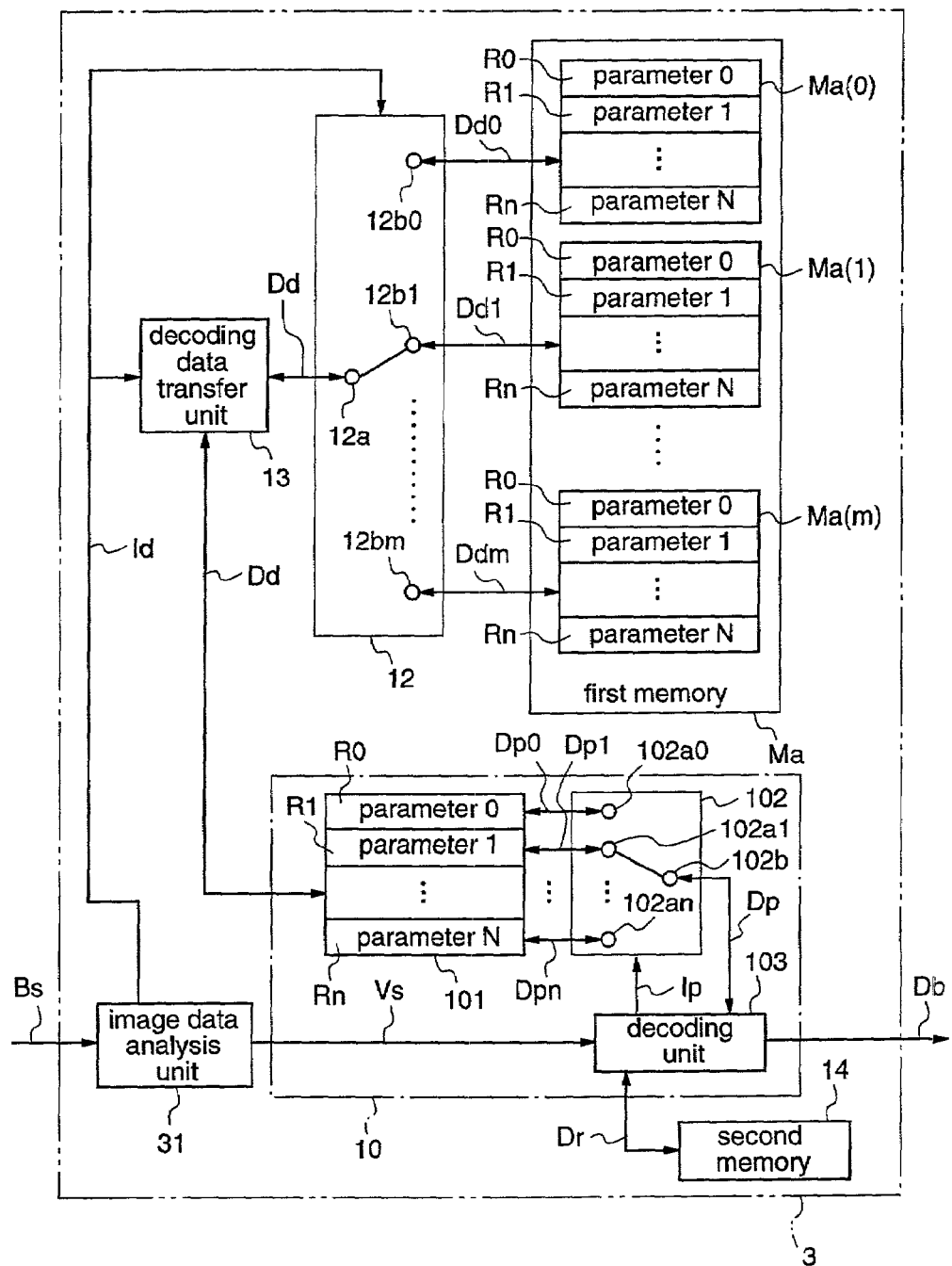
FIG. 7 is a block diagram for explaining an image decoding apparatus according to a third embodiment of the present invention.

FIG. 7 is a block diagram for explaining an image decoding apparatus 3 according to a third embodiment of the present invention.

The image decoding apparatus 3 of this third embodiment includes, in addition to the constituent elements of the image decoding apparatus 1 of the first embodiment, an image data interpreting analysis unit 31 for interpreting a bit stream Bs inputted as image data, and separating the bit stream Bs into image sequence identifying information (object identifier) Id according to the first embodiment and image data (video stream) Vs other than the object identifier Id. The image data interpreting unit 31 outputs the object identifier Id to the memory region selection unit 12 and to the decoding data transfer unit 13, and outputs the video stream Vs to the decoder 10. Accordingly, in the image decoding apparatus 3 of this third embodiment, in contrast with the image decoding apparatus 1 of the first embodiment, selection of a target image sequence to be decoded is carried out according to the inputted bit stream Bs.

Figure 9:
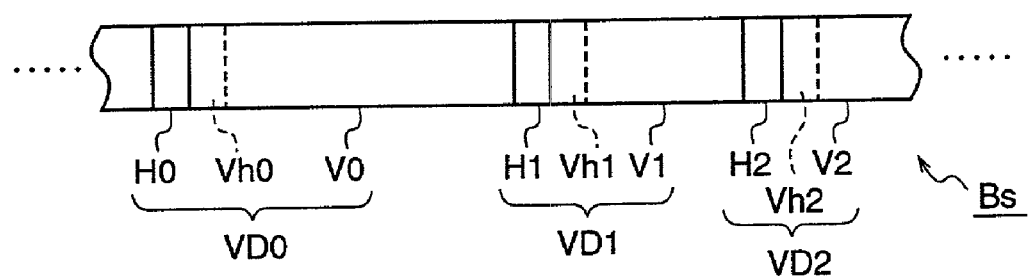
FIG. 9 is a diagram illustrating the data structure of a bit stream which is an input signal to the image decoding apparatus of the third or fourth embodiment.

FIG. 9 is a diagram illustrating the data structure of the bit stream Bs inputted to the image decoding apparatus 3.

The bit stream Bs is divided into predetermined processing units, and unit data corresponding to each processing unit is composed of an object identifier Id and other image information (video stream) Vs. For example, when the bit stream Bs corresponds to MPEG4 coding scheme which enables coding or handling of an image signal corresponding to one scene for every object (image sequence) as one of components of the scene, the above-mentioned processing unit corresponds to one frame as one of the components of each object (hereinafter, referred to as a VOP (Video Object Plane)).

More specifically, as shown in FIG. 9, the bit stream Bs corresponding to MPEG4 includes unit data VD0, VD1, and VD2 corresponding to VOP(0), VOP(1), and VOP(2), respectively. The respective unit data VD0, VD1, and VD2 are composed of image data (VOP data) V0, V1, and V2 which are obtained by coding digital image signals corresponding to the respective VOPs, and object identifiers H0, H1, and H2 which are added to the respective image data. The image data (VOP data) V0, V1, and V2 include VOP headers Vh0, Vh1, and Vh2 which are data to be required when decoding the VOP(0), VOP(1), and VOP(2), respectively. The object identifiers H0–H2 added to the respective VOP data show the objects (image sequences) including the respective VOP data. The video stream Vs employed in the first embodiment comprises the image data including the VOP headers corresponding to the respective objects, other than the object identifier H0–H2. The header information of the video stream Vs corresponds to the VOP headers Vh0–Vh2.

Other constituent elements of the image decoding apparatus 3 of this third embodiment are identical to those of the image decoding apparatus 1 of the first embodiment.

Hereinafter, the construction of the image decoding apparatus 3 will be described briefly.

The image decoding apparatus 3 includes a decoder 10, a first memory Ma, and a second memory 14. The decoder 10 receives the video stream Vs supplied from the image data interpreting unit 31, extracts parameter data Dp (decoding data) on the basis of the header data (VOP headers) of the respective VOPs, and performs decoding on the VOP data by referring to already-processed VOP data as necessary. The first memory Ma has decoding data storage regions (memory regions) Ma(0), Ma(1), Ma(m) corresponding to plural objects (image sequences) Ob0, Ob1, . . . , Obm to be simultaneously decoded, respectively, and stores desired decoding data Dd0, Dd1, . . . , Ddm in the respective memory regions. The second memory 14 holds already-processed VOP data to be referred to in the above-mentioned decoding process, as reference image data Dr.

The image decoding apparatus 3 further includes a decoding data transfer unit 13, and a memory region selection unit 12. The decoding data transfer unit 13 transfers the decoding data Dp corresponding to each object between the first memory Ma and the decoder 10 on the basis of the object identifier Id. The memory region selection unit 12 is placed between the decoding data transfer unit 13 and the first memory Ma, and the memory region selection unit 12 selects one of the memory regions Ma(0)–Ma(m) in the first memory Ma on the basis of the object identifier Id to enable access to the decoding data between the selected memory region and the decoding data transfer unit 13.

The memory region selection unit 12 is identical in construction to that of the first embodiment. Further, the decoding data transfer unit 13 is different from that of the first embodiment only in that the decoding data transfer unit 13 of the third embodiment transfers decoding data Dd from the decoding data storage register 101 of the decoder 10 to the first memory Ma according to but the object identifier Id, instead of a timing signal It.

The decoder 10 comprises a decoding unit 103, a decoding data storage register 101, and a parameter selector 102, as in the case of the image decoding apparatus 1 of the first embodiment. The decoding unit 103 extracts decoding data Dd corresponding to a target VOP data to be decoded, and generates an object identifier Id corresponding to the target VOP data. The decoding data storage register 101 holds the decoding data Dd extracted by the decoding unit 103 or the decoding data Dd which will be required in the decoding process. The parameter selector 102 is placed between the decoding unit 103 and the decoding data storage register 101. Further, the decoding unit 103 is different from that of the first embodiment only in that the decoding unit 103 of the third embodiment does not output a timing signal It.

Next, the operation of the image decoding apparatus 3 of this third embodiment will be described.

The operation of the image decoding apparatus 3 is identical to the operation of the image decoding apparatus 1 of the first embodiment except for the operation of the image data interpreting unit 31, and therefore, the operation relating to the image data interpreting unit 31 will be mainly described hereinafter.

When unit data corresponding to each VOP is sequentially inputted as a bit stream Bs to the image decoding apparatus 3, the image data interpreting unit 31 interprets the bit stream Bs corresponding to the unit data of the inputted VOP, and separates the unit data into an object identifier Id for identifying an object to be processed and other image information (video stream) Vs. The object identifier Id is outputted to the memory region selection unit 12 and to the decoding data transfer unit 13, and the video stream Vs is outputted to the decoder 10.

Next, the memory region selection unit 12 selects a target object to be decoded, on the basis of the object identifier Id outputted from the image data interpreting unit 31, and the decoding data transfer unit 13 transfers decoding data Dd corresponding to the target object from the first memory Ma to the decoding data storage register 101 in the decoder 10.

Further, in the decoder 10, the decoding unit 103 performs decoding on the VOP data with reference to the decoding data Dd stored in the decoding data storage register 101.

When decoding of the inputted VOP data is completed and the image data interpreting unit 31 detects an object identifier Id corresponding to the next VOP data, the decoding data transfer unit 13 transfers the decoding data Dd stored in the decoding data storage register 101, to a memory region in the first memory Ma, which is selected at this point of time by the memory region selection unit 12.

When this transfer is completed, the memory region selection unit 12 selects a memory region in the first memory Ma, which corresponds to the target object to be decoded, on the basis of the object identifier Id corresponding to the next VOP, and thereafter, decoding of this VOP data is carried out in the same manner as described above.

In this way, decoding of each VOP which is sequentially inputted as a bit stream Bs is repeated on the basis of the unit data corresponding to each VOP, and the decoded image data Db corresponding to each VOP is generated.

As described above, the image decoding apparatus 3 of this third embodiment is provided with, in addition to the constituent elements of the image decoding apparatus 1 of the first embodiment, the image data interpreting unit 31 which interprets a bit stream Bs inputted as unit data corresponding to each VOP, separates the unit data into an object identifier Id for identifying an object to be processed and image information (video stream) Vs other than the object identifier Id, and outputs the object identifier Id to the memory region selection unit 12 and to the decoding data transfer unit 13 while outputting the video stream Vs to the decoder 10. Therefore, in addition to the effects obtained by the first embodiment, a target object to be decoded can be selected according to a bit stream Bs which is inputted as unit data corresponding to each VOP.

Furthermore, the decoder 10 is provided with the decoding data storage register 101 for holding the decoding data Dd to be referred to in the decoding process, and the decoding data Dd corresponding to each object is transferred between the decoding data storage register 101 and the first memory Ma which holds the decoding data Dd corresponding to all objects to be decoded. Therefore, the process of decoding the respective VOP data on the basis of the decoding data Dd corresponding to the respective target objects can be carried out by using the single decoder 10. Further, when the decoding data storage register 101 is constituted by a quick access storage such as a cache or a SRAM, the performance of the image decoding apparatus 3 can be enhanced.

Furthermore, even when the number of target objects Ob included in the bit stream Bs is increased, additional memory regions for holding the decoding data Dd corresponding to the increased objects can be easily provided by allocating the memory regions on the memory space of the first memory Ma within the capacity of the first memory Ma.

Furthermore, the plural parameter data Dp constituting the decoding data Dd are transferred between the decoding data storage register 101 where the storage positions for the respective parameters are set, and the memory regions in the first memory Ma where the storage positions for the respective parameters are set. Therefore, even when the target object to be decoded is changed during the decoding process by the decoding unit 103, the parameter storage positions in the respective decoding data storage regions (memory regions) in the first memory Ma are not changed. Consequently, the computational complexity relating to the parameter storage position when the target object is changed can be reduced.

While the decoder 10 in the third embodiment is provided with the decoding data storage register 101 in which the decoding data Dd corresponding to the target object to be decoded is stored, the construction of the decoder 10 is not restricted thereto. When the first memory Ma has a temporary memory region in which the decoding data Dd corresponding to the target object is temporarily stored, the decoder 10 may be provided with a register wherein only part of all parameter data Dp corresponding to the target object is stored, and the decoding data may be transferred in parameter units between the register and the temporary memory region.

Fourth Embodiment

Figure 8:
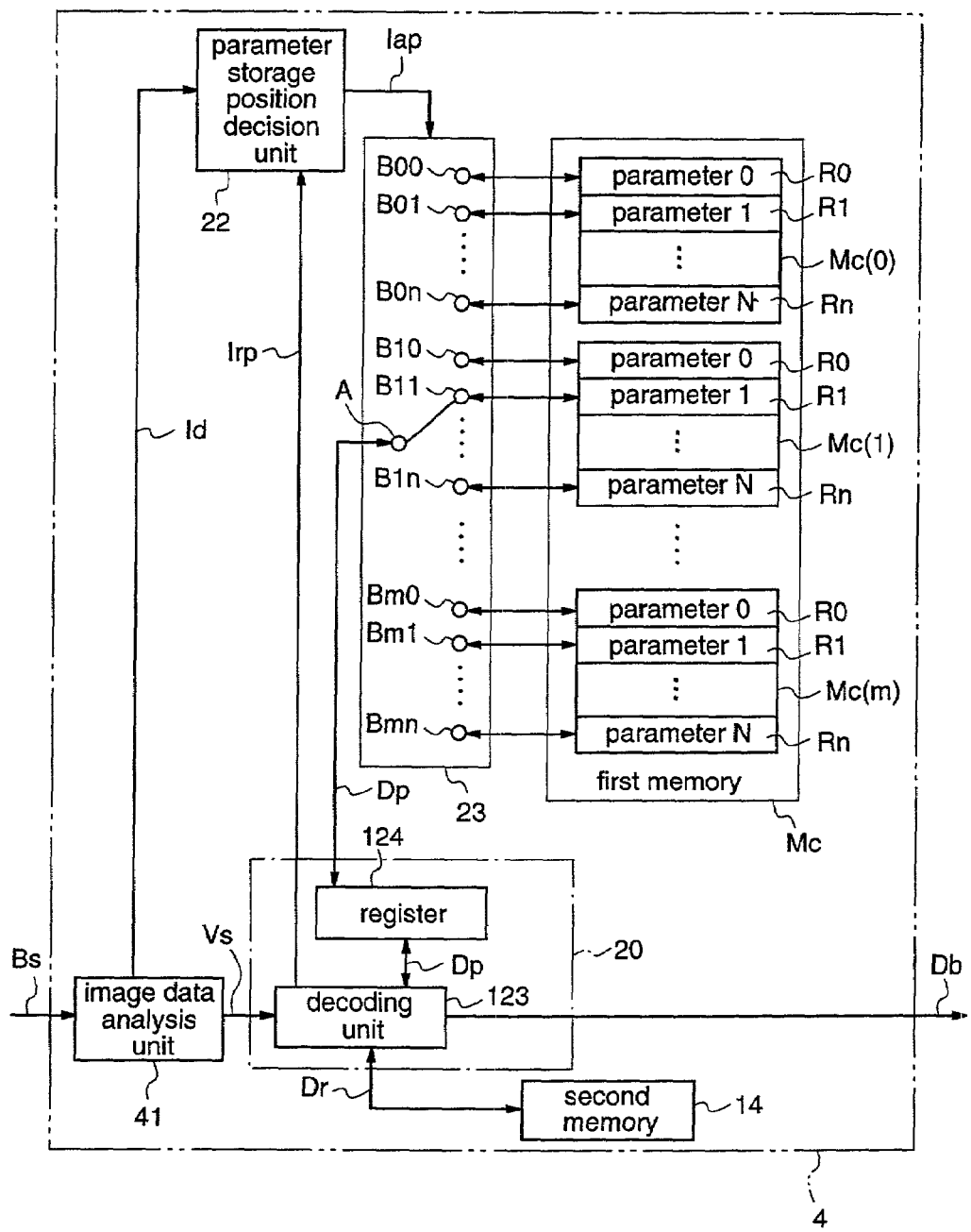
FIG. 8 is a block diagram for explaining an image decoding apparatus according to a fourth embodiment of the present invention.

FIG. 8 is a block diagram illustrating an image decoding apparatus 4 according to a fourth embodiment of the present invention.

The image decoding apparatus 4 according to the fourth embodiment includes, in addition to the constituent elements of the image decoding apparatus 2 of the second embodiment, an image data interpreting (analysis) unit 41 for interpreting a bit stream Bs inputted as image data, and separating the bit stream Bs into image sequence identifying information (object identifier) Id according to the second embodiment and image data (video stream) Vs other than the object identifier Id. The image data interpreting unit 41 pputputs the object identifier Id to the parameter storage position decision unit 22, and outputs the video stream Vs to the decoder 20. Accordingly, in the image decoding apparatus 4 of this fourth embodiment, in contrast with the image decoding apparatus 2 of the second embodiment, selection of a target object to be decoded is carried out according to the inputted bit stream Bs.

Further, the data structure of the bit stream Bs inputted to the image decoding apparatus 4 is identical to that of the bit stream Bs inputted to the image decoding apparatus 3 of the third embodiment.

Other constituent elements of the image decoding apparatus 4 according to this fourth embodiment are identical to those of the image decoding apparatus 2 according to the second embodiment.

Hereinafter, the construction of the image decoding apparatus 4 will be described.

The image decoding apparatus 4 includes a decoder 20, a first memory Mc, and a second memory 14. The decoder 20 receives a video stream Vs supplied from the image data interpreting unit 41, extracts parameter data Dp (decoding data) on the basis of header information (VOP header) of each VOP, and performs decoding on the VOP data by referring to already-processed VOP data as necessary. The first memory Mc has memory regions (decoding data storage regions) Mc(0), Mc(1), . . . , Mc(m) corresponding to plural objects to be simultaneously decoded, respectively, and stores desired decoding data Dd0, Dd1, . . . , Ddm in the respective memory regions. The second memory 14 holds already-processed VOP data to be referred to in the above-mentioned decoding process, as reference image data Dr.

The decoder 20 comprises a decoding unit 123, and a register 124. The decoding unit 123 extracts various kinds of parameter data Dp as decoding data corresponding to a target VOP to be decoded by analyzing header information (VOP header) of the inputted video stream Vs, and generates parameter relative storage position information Irp for identifying the parameter data Dp. The register 124 holds the parameter data Dp corresponding to the target VOP, which is supplied from the decoding unit 123.

Further, the image decoding apparatus 4 includes a parameter storage position decision unit 22, and a parameter storage position selection unit 23. The parameter storage position decision unit 22 decides an absolute storage position AP for the parameter data on the basis of the image sequence identifying information Id corresponding to each object and the parameter relative storage position information Irp supplied from the decoding unit 123 in the decoder 20, and outputs parameter absolute storage position information Iap indicating the absolute storage position. The parameter storage position selection unit 23, which is placed between the decoder 20 and the first memory Mc, selects a parameter storage position in a memory region in the first memory Mc on the basis of the parameter absolute storage position information Iap to enable access to the parameter data Dp between the selected parameter storage position and the register 124 of the decoder 20.

Next, the operation of the image decoding apparatus 4 constructed as described above will be described.

The operation of the image decoding apparatus 4 is identical to that of the image decoding apparatus 2 of the second embodiment except for the operation of the image data interpreting unit 41, and therefore, the operation of the image data interpreting unit 41 will be mainly described hereinafter.

When unit data corresponding to each VOP is sequentially inputted as a bit stream Bs to the image decoding apparatus 4, the image data interpreting unit 41 interprets the unit data corresponding to the inputted VOP, and separates the unit data into an object identifier Id for identifying an object to be processed and other image data (video stream) Vs. The object identifier Id is outputted to the parameter storage position decision unit 22, and the video stream Vs is outputted to the decoder 20.

In the decoder 20, the decoding unit 123 performs decoding on the target VOP. In this decoding process, initially, the header of the target VOP (VOP header) is analyzed to obtain parameter data Dp which is required for the VOP data decoding process, and a relative storage position RP of the parameter data Dp indicating the kind of each parameter is generated as parameter relative storage position information Irp. The parameter data Dp obtained as decoding data in the decoding process is stored in the register 124 in the decoder 20. Further, the parameter relative storage position information Irp is outputted to the parameter storage position decision unit 22.

In the parameter storage position decision unit 22, a parameter storage position in the first memory Mc is decided on the basis of the parameter relative storage position information Irp supplied from the decoding unit 123 and the object identifier Id supplied from the image data interpreting unit 41, and the parameter data Dp obtained in the decoding unit 123 is transferred to the decided parameter storage position. That is, the obtained parameter data Dp corresponding to the target VOP is stored in a memory region in the first memory Mc, which memory region corresponds to an object including the target VOP.

The storage position in the first memory Mc, where the parameter data Dp obtained in the decoding unit 123 is to be stored, is decided by the parameter storage position decision unit 22 in the same manner as described for the second embodiment.

On the other hand, in the case where the parameter data Dp as decoding data is referred to when the video stream Vs is decoded by the decoding unit 123, the parameter storage position is decided in the same manner as described above, and parameter data Dp stored in the decided position is transferred from the first memory Mc to the register 124. Then, decoding of the video stream Vs is carried out on the basis of the parameter data Dp stored in the register 124. When transferring the parameter data Dp between the first memory Mc and the register 124, the parameter storage position selection unit 23 selects one of the plural parameter storage positions in the first memory Mc by the same operation as described for the parameter storage position selection unit 23 according to the second embodiment.

When a bit stream (unit data) Bs corresponding to the next VOP is inputted, the image data interpreting unit 41 detects an object identifier Id corresponding to this VOP, the parameter data Dp is transferred between the register 124 and the first memory Mc on the basis of the object identifier Id, and decoding of the video stream (VOP data) corresponding to this VOP is carried out on the basis of the parameter data Dp stored in the register 124.

In this way, decoding of each VOP, which is sequentially inputted as a bit stream Bs, is repeated on the basis of the unit data corresponding to each VOP, whereby the decoded image data Db corresponding to each VOP is generated.

As described above, the image decoding apparatus 4 according to this fourth embodiment is provided with, in addition to the constituent elements of the image decoding apparatus 2 of the second embodiment, the image data interpreting unit 41 which interprets a bit stream Bs inputted as unit data corresponding to each VOP, separates the bit stream Bs into an object identifier Id for identifying a target object to be decoded and other image data (video stream) Vs, and outputs the object identifier Id to the parameter storage position decision unit 22 while outputting the video stream Vs to the decoder 20. Therefore, in addition to the effects of the second embodiment, selection of a target object to be decoded can be carried out according to a bit stream Bs which is inputted as unit data corresponding to each VOP.

Furthermore, as in the second embodiment, the decoder 20 of this fourth embodiment is provided with the register 124 for holding parameter data Dp to be referred to as decoding data in the decoding process, and the parameter data Dp corresponding to each object is transferred between the register 124 and the first memory Mc which holds the decoding data Dd corresponding to all objects to be decoded. Therefore, even when the target object is changed during the process of decoding the video stream Vs, storage and readout of the parameter data of the target object can be carried out by using the register 124, whereby decoding processes for plural objects can be carried out in parallel, using a single decoder.

Moreover, even when the number of target objects is increased, additional memory regions for decoding data of the increased objects can be easily provided by assigning the memory regions on the memory space of the first memory Mc within the range of the capacity of the first memory Mc.

While a target object to be decoded is decided in this fourth embodiment on the basis of the object identifier Id every time the parameter storage position decision unit 22 derives parameter absolute storage position information Iap, the method of deriving the parameter absolute storage position information Iap is not restricted thereto.

For example, the parameter storage position decision unit 22 may derive the parameter absolute storage position information Iap as follows. When a video stream of a first VOP corresponding to each object is inputted, a target object to be decoded is selected on the basis of the object identifier Id corresponding to the first VOP, and the header position information which indicates the head position SA of a memory region holding the decoding data corresponding to the selected object is stored. Then, the parameter absolute storage position information Iap corresponding to each parameter data Dp to be used as decoding data when a subsequent VOP is decoded, is derived on the basis of the stored header position information. In this case, the parameter storage position decision unit 22 decides the head position SA of a memory region and updates the stored information indicating the head position SA of the memory region, only when the decision unit 22 is given an object identifier Id of a new target of decoding. Thereby, the computational complexity in the parameter storage position decision unit 22 can be reduced.

Furthermore, also in the second, third, and fourth embodiments, the first memory Ma (Mc) for holding the decoding data Dd and the second memory 14 for holding the data other than the decoding data Dd (e.g., data to be temporarily stored, or reference image data Dr) are different memories. However, the first and second memories may be constituted by a single memory. In this case, a region for holding the decoding data Dd and a region for holding the data other than the decoding data Dd are allocated on this single memory.

Moreover, in the third and fourth embodiments, the bit stream Bs inputted to the image decoding apparatus 3 or 4 is a bit stream in which an object identifier Id is added to every VOP that is a processing unit based on MPEG4. However, the object identifier Id may be added to a fundamental processing unit of image data corresponding to each image sequence other than VOP, for example, a picture or a frame based on MPEG1 or MPEG2. Further, the object identifier Id may be added to every processing unit including a plurality of the above-mentioned fundamental units.

An image decoding program for permitting a computer to perform any of the image decoding processes according to the aforementioned embodiments can be recorded on a data storage medium such as a floppy disk, whereby the image decoding process can easily be carried out in an individual computer system by using the program stored in the medium.

Figure 10A:
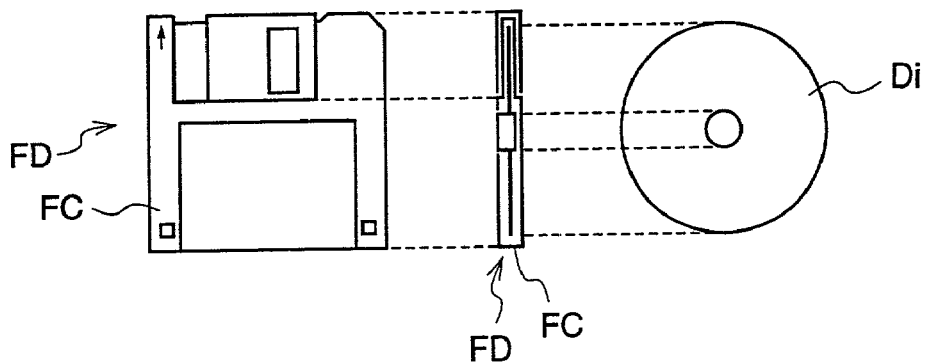
FIGS. 10($a$) and 10($b$) are diagrams for explaining a program storage medium containing a program which permits a computer system to perform a decoding process according to any of the aforementioned embodiments, and FIG. 10($c$) is a diagram illustrating the computer system.
Figure 10B:
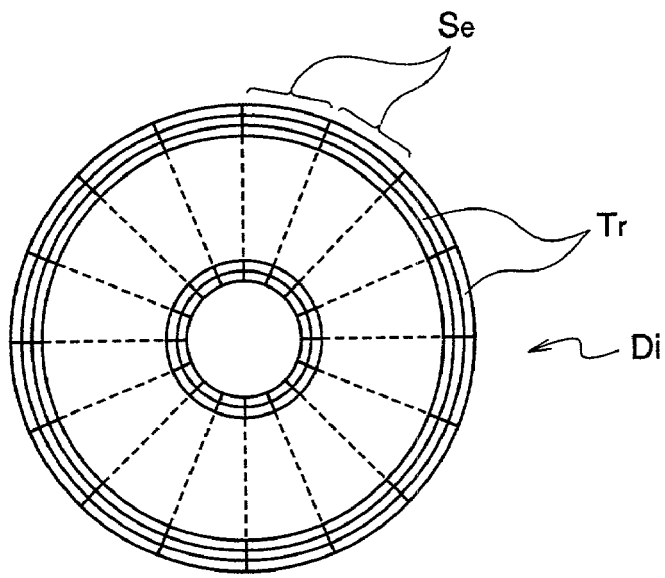
Figure 10C:
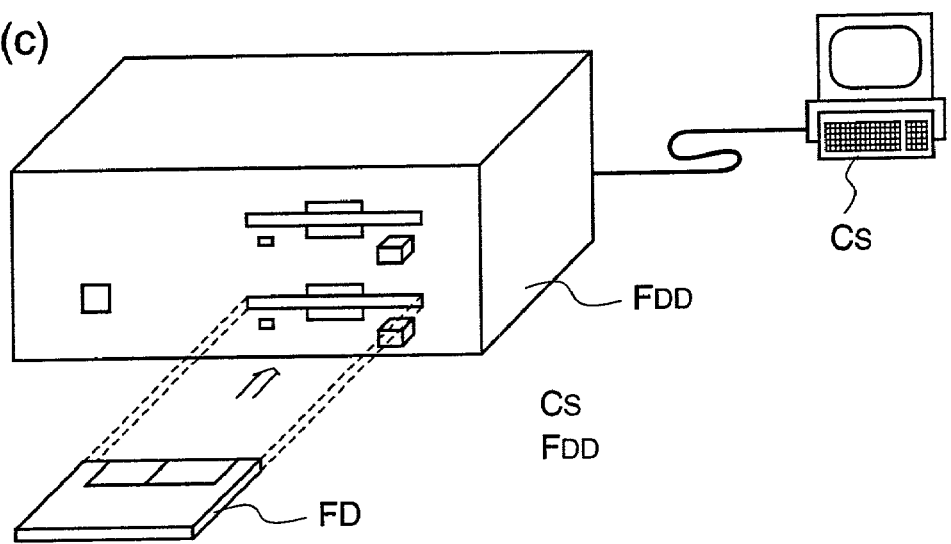
Figure 11A:
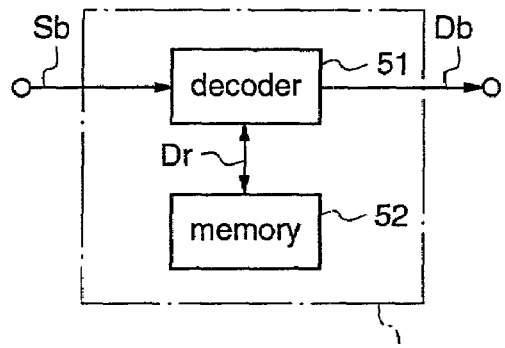
FIG. 11($a$) is a block diagram for explaining a conventional image decoding apparatus for decoding image data corresponding to a single image sequence, and FIG. 11($b$) is a block diagram for explaining a conventional image decoding apparatus for decoding image data corresponding to plural image sequences by using plural decoders.
Figure 11B:
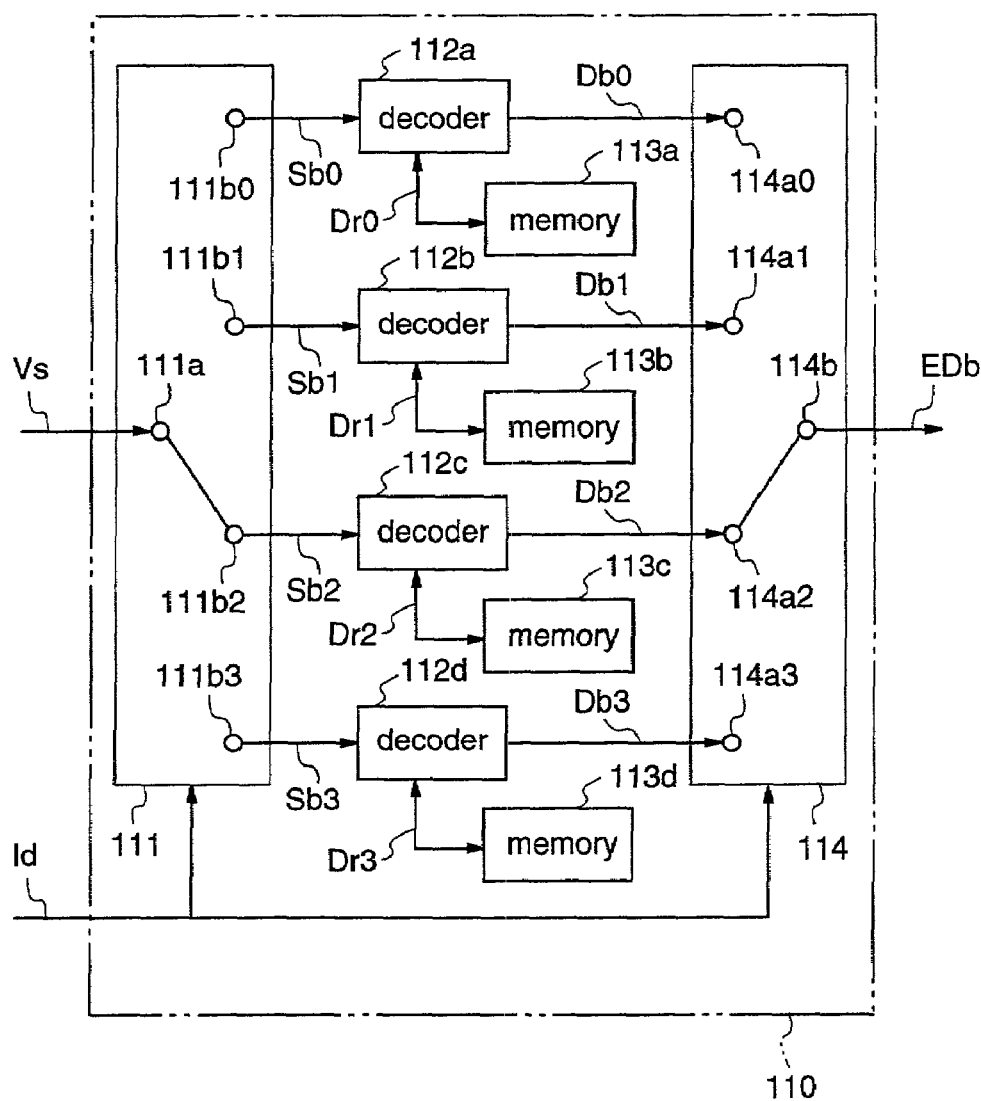
Figure 12:
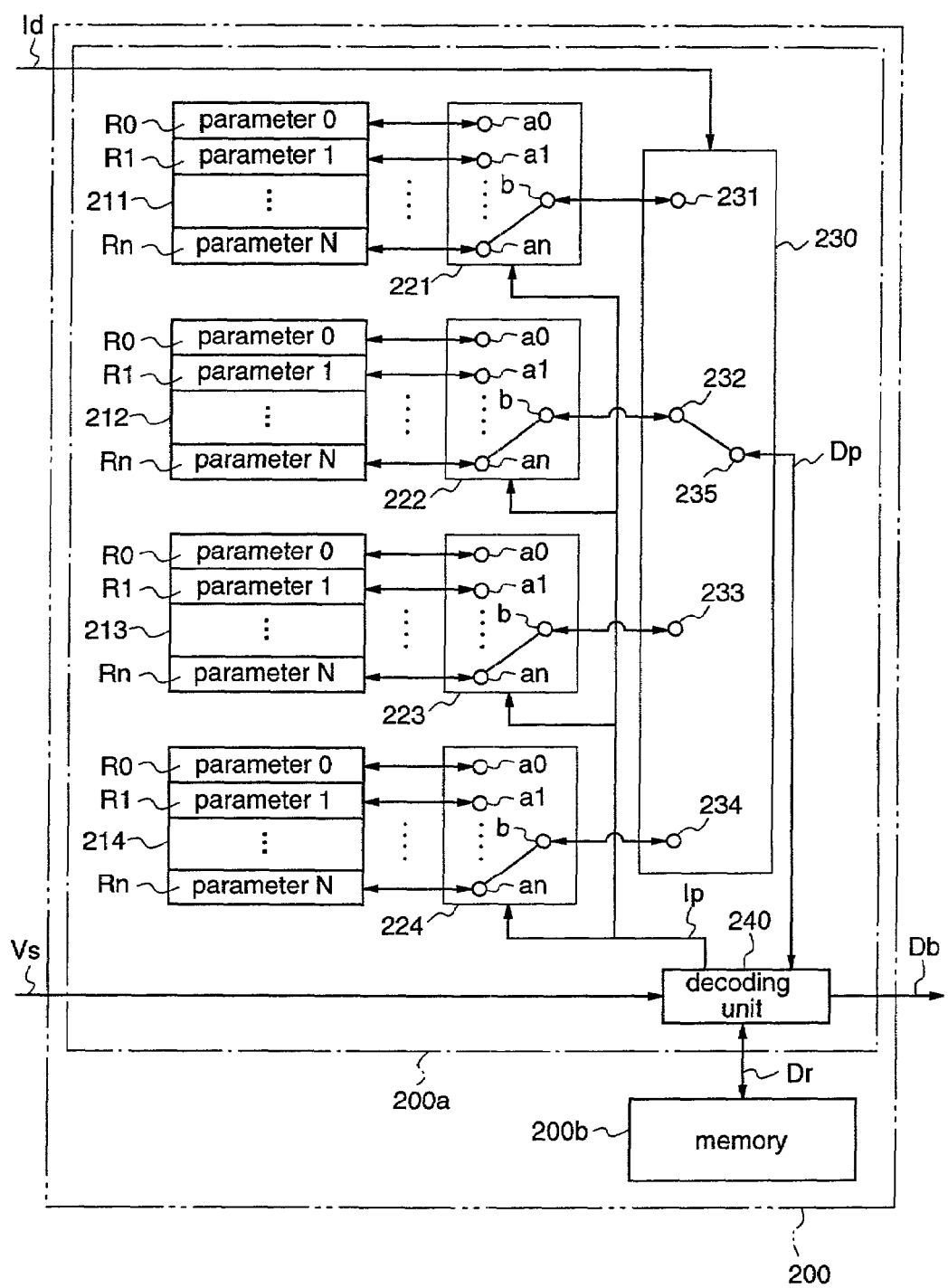
FIG. 12 is a block diagram for explaining a conventional image decoding apparatus for decoding image data corresponding to plural image sequences by using a single decoder.
Figure 13:
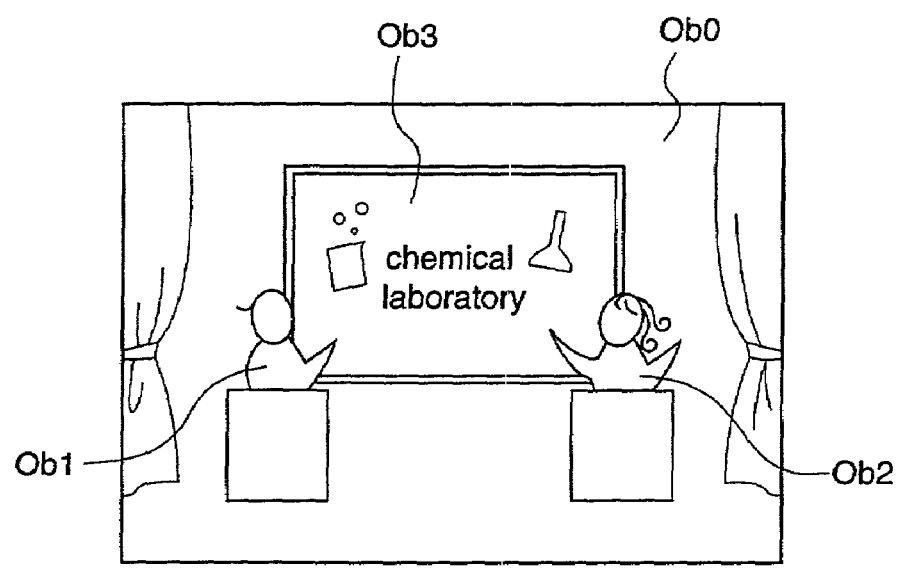
FIG. 13 is a diagram illustrating an example of a displayed composite image.

FIGS. 10(a)–10(c) are diagrams for explaining the execution of an image decoding process according to any of the aforementioned embodiments and modifications, by a computer system, using a floppy disk containing the above-described image decoding program.

FIG. 10(a) illustrates a front view of a floppy disk FD, a cross-sectional view thereof, and a floppy disk body Di. FIG. 10(b) shows an example of a physical format of the floppy disk body Di.

The floppy disk FD is obtained by mounting the floppy disk body Di in a floppy disk case FC. At the surface of the floppy disk body Di, a plurality of tracks Tr are formed concentrically from the outer circumference toward the inner circumference. Each track Tr is divided into 16 sectors Se at equal angles. Therefore, in the floppy disk FD containing the above-mentioned program, data of the program is recorded in the sectors Se which are allocated on the floppy disk body Di.

FIG. 10(c) illustrates a system for recording the image decoding program in the floppy disk FD, and performing the image decoding process by software using the image decoding program stored in the floppy disk FD.

When recording the image decoding program in the floppy disk FD, data of the image decoding program is read from a computer system us and written in the floppy disk FD through a floppy disk drive FDD. When constructing the above-mentioned image decoding apparatus in the computer system Cs according to the program recorded in the floppy disk FD, the program is read from the floppy disk FD by using the floppy disk drive FDD and then loaded onto the computer system Cs.

Although a floppy disk is shown in FIGS. 10(a)–10(c) as an example of the program storage medium, an optical disk may be employed as the program storage medium. Also, in this case, an image decoding process according to any of the aforementioned embodiments can be executed by software in the same manner as described for the floppy disk. Furthermore, the program storage medium is not restricted to the optical disk or floppy disk, and any disk, such as an IC card or a ROM cassette, may be employed so long as the program can be recorded on it. Also, in the case of using these mediums, an image decoding process according to any of the aforementioned embodiments can be executed by software in the same manner as described for the floppy disk.

What is claimed is:

1. An image decoding apparatus for decoding image data including plural image sequences, said image decoding apparatus comprising:
   a memory having plural memory regions respectively corresponding to the plural image sequences, and being operable to hold decoding information to be used when the image data of the respective image sequences are decoded;
   a memory region selection unit operable to select one of said memory regions in said memory based on image identifying information which indicates a target image sequence to be decoded, said one of said memory regions corresponding to the target image sequence to be decoded;
   a temporary data holding unit operable to temporarily hold the decoding information of the target image sequence transferred from said memory;
   a decoding information transfer unit operable to transfer the decoding information of the target image sequence collectively from said one of said memory regions selected by said memory region selection unit to said temporary data holding unit; and
   a decoder operable to perform decoding on the image data of the target image sequence based on the decoding information held in said temporary data holding unit.

2. The image decoding apparatus of claim 1, wherein said temporary data holding unit is a register operable to hold the decoding information of the target image sequence, and said register is included in said decoder.

3. The image decoding apparatus of claim 1, wherein said temporary data holding unit is a temporary memory region operable to hold the decoding information of the target image sequence, said temporary memory region being included in said memory and being different from said plural memory regions respectively corresponding to the image sequences.

4. An image decoding method for decoding image data including plural image sequences, said method comprising:
   selecting decoding information of a target image sequence to be decoded from decoding information respectively including plural parameters of the image sequences, the decoding information being stored in a memory and being used when the image data of the respective image sequences are decoded;
   deciding storage positions in the memory of parameters which are required for decoding, among the plural parameters constituting the selected decoding information; and
   decoding the image data of the target image sequence based on the parameters stored in the decided storage positions;
   wherein, in said deciding of the storage positions of the parameters, the memory region corresponding to the target image sequence is specified based on image identifying information, and the storage positions in the specified memory region of the parameters which parameters are required when the target image sequence is decoded are decided based on a type of the parameters.

5. The image decoding method of claim 4, wherein said deciding of the storage positions in the memory of the parameters which are required for decoding decides the storage positions of the required parameters based on the image identifying information, which indicates the target image sequence.

6. A program storage medium containing a program for making a computer perform data processing on image data including plural image sequences, wherein
   said program is a data processing program which makes the computer perform said method of claim 4.

7. An image decoding method for performing decoding on image data comprising plural image sequences based on respective decoding information of the image sequences, said method comprising:
   selecting a memory region corresponding to a target image sequence to be decoded, from plural memory regions respectively corresponding to the image sequences, in a memory for holding decoding information to be used when the image data of the respective image sequences are decoded, based on image identifying information which indicates the target image sequence;
   transferring decoding information of the target image sequence collectively from the selected memory region to a temporary data storage unit for temporarily holding the decoding information of the target image sequence, and decoding the image data of the target image sequence, with reference to the decoding information stored in the temporary data storage unit.

8. A program storage medium containing a program for making a computer perform data processing on image data including plural image sequences, wherein
   said program is a data processing program which makes the computer perform said method of claim 7.

9. An image decoding apparatus for decoding image data including plural image sequences, said image decoding apparatus comprising:
   a memory having plural memory regions respectively corresponding to the plural image sequences, and being operable to hold decoding information including plural parameters to be used when the image data of the respective image sequences are decoded;

a parameter storage position decision unit operable to decide storage positions of parameters, which are required when a target image sequence to be decoded is decoded, in one of said plural memory regions corresponding to the target image sequence to be decoded based on image identifying information which indicates the target image sequence; and a decoder operable to perform decoding on the target image sequence based on the parameters stored in the parameter storage positions decided by said parameter storage position decision unit;

wherein said parameter storage position decision unit is operable to specify one of said plural memory regions corresponding to the target image sequence based on the image identifying information, and to decide the storage positions of the parameters which are required when the target image sequence is decoded on said specified one of said plural memory regions based on a type of the required parameters.

* * * * *